United States Patent [19]

Manabe et al.

[11] 4,135,459

[45] Jan. 23, 1979

[54] AUTOMATIC SEWING MACHINE

[75] Inventors: Takao Manabe, Sunto; Shinji Machi, Mishima; Sigetugu Matunaga, Numazu, all of Japan

[73] Assignee: Toshiba Kikai Kabushiki Kaisha, Tokyo, Japan

[21] Appl. No.: 732,485

[22] Filed: Oct. 14, 1976

[30] Foreign Application Priority Data

Oct. 17, 1975 [JP] Japan .................... 50-125671

[51] Int. Cl.² .......................................... D05B 21/00
[52] U.S. Cl. .............................. 112/121.12; 112/275
[58] Field of Search ............ 112/121.12, 12.11, 158 E, 112/219 A, 275, 277; 318/567, 569

[56] References Cited

U.S. PATENT DOCUMENTS

| | | | |
|---|---|---|---|
| 3,208,414 | 9/1965 | Reeber et al. | 112/121.12 |
| 3,752,098 | 8/1973 | Logan et al. | 112/121.12 |
| 3,830,175 | 8/1974 | Levor | 112/121.12 |
| 3,872,808 | 3/1975 | Wurst | 112/158 E |
| 3,982,491 | 9/1976 | Herzer et al. | 112/121.12 |

Primary Examiner—Peter Nerbun
Attorney, Agent, or Firm—Koda and Androlia

[57] ABSTRACT

A support carrying a cloth clamping member is moved in the X and Y directions of rectangular coordinates by a pair of pulse motors which are controlled by a control system to perform a profile sewing of a predetermined pattern. Reciprocation and stopping of the needle at the upper or lower dead center are also controlled by the control system which comprises a memory device for storing information regarding the numbers of pulses required to drive the pulse motors for moving the support in the X and Y directions by one sewing pitch and regarding repeated numbers of the sewing pitch in the X and Y directions, the pulses being produced by converting the profile into the amounts of movements in the X and Y directions, and information which commands the starting of the sewing operation, thread cutting, vertical reciprocation of the needle and the stopping of the needle at a upper or a lower dead center, in the form of binary codes and according to the predetermined sequences of the sewing operation.

7 Claims, 27 Drawing Figures

FIG.2 CONTROL SYSTEM 17

ADDRESS SELECTION SWITCHING CIRCUIT

NOISE FILTERS

FIG. 5A
FIG. 5B
FIG. 6A  ADDRESS GATE CIRCUIT
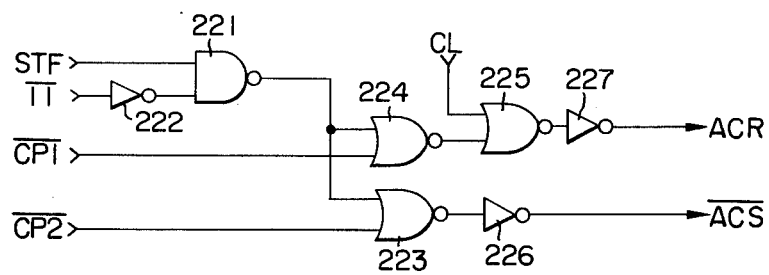
FIG. 6B
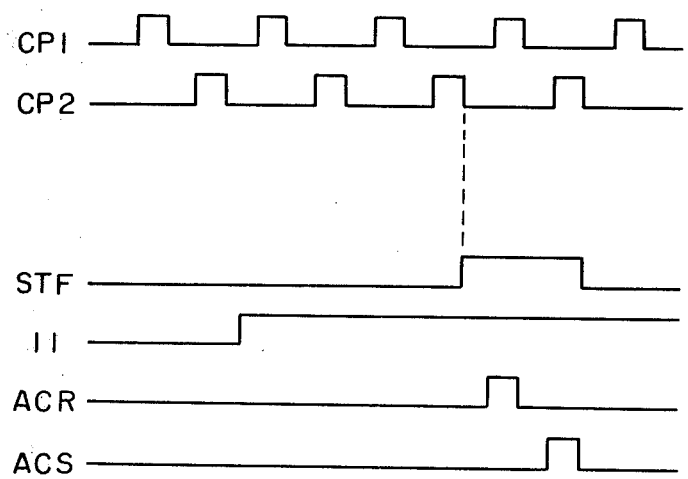

FIG. 7 ADDRESS COUNTER
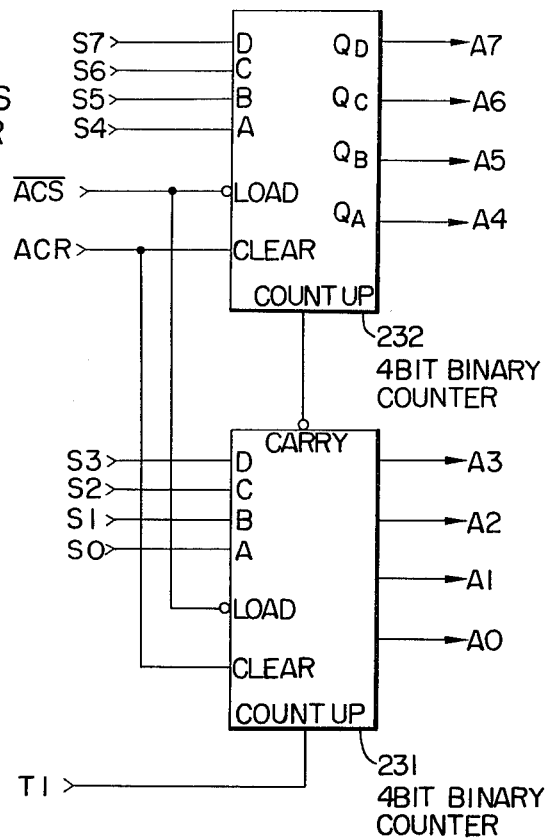
FIG. 9 DECODER 105
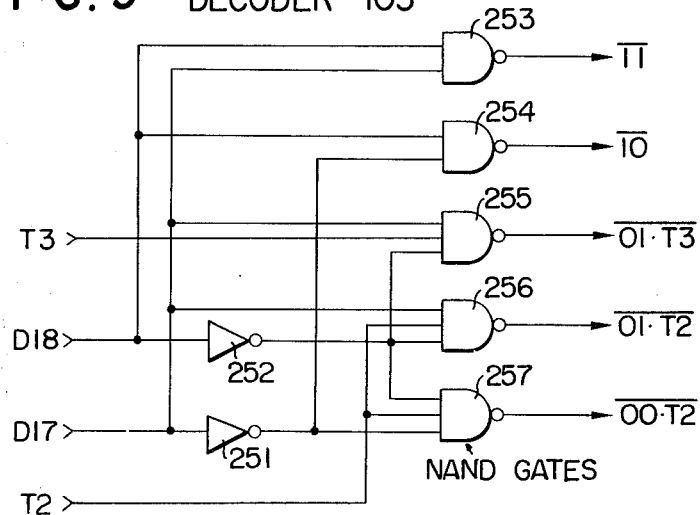

PROM 104

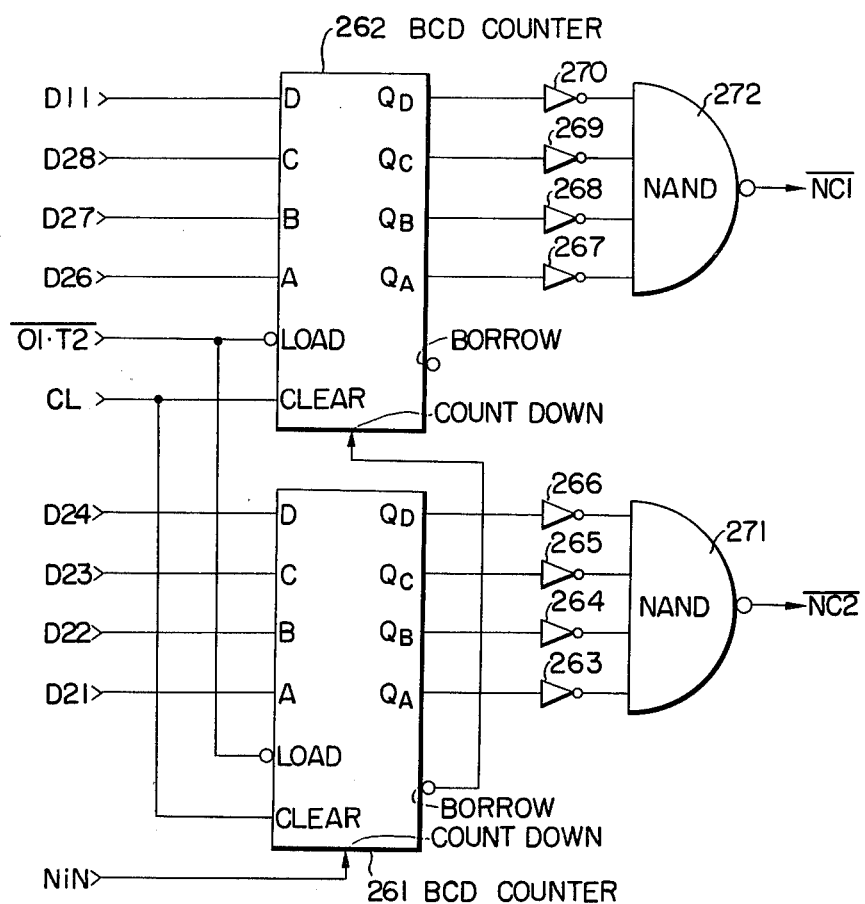

X AND Y AXIS COMMAND COUNTERS

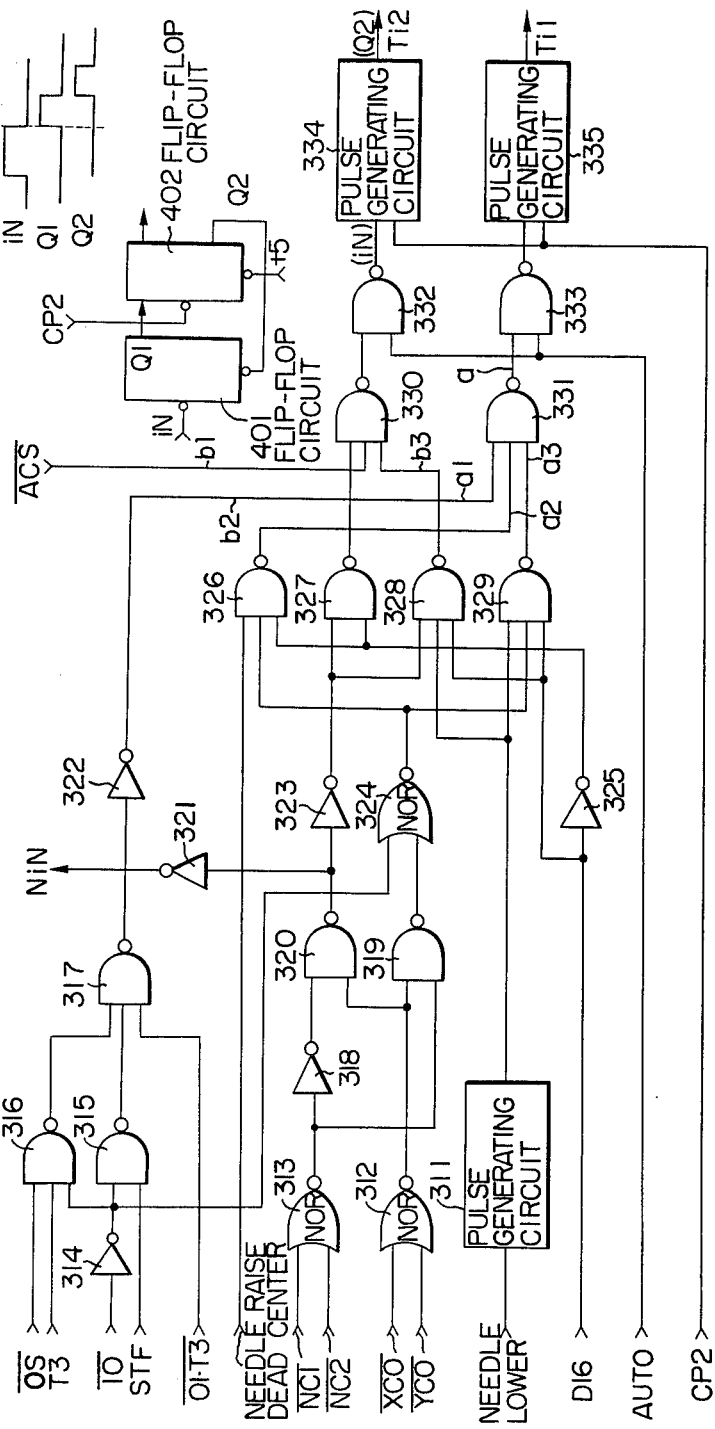

TIMING PULSE GENERATOR 106

FIG. 19

| SEQUENCE NO | TYPE OF CONTROL | START | THREAD CUT | STOP AT UPPER DEAD CENTER | STOP AT LOWER DEAD CENTER | NO. OF NEEDLE RECIPROCATIONS | DIRECTION OF MOVEMENT ALONG X AXIS | AMOUNT OF MOVEMENT ALONG X AXIS | DIRECTION OF MOVEMENT ALONG Y AXIS | AMOUNT OF MOVEMENT ALONG Y AXIS | CORRESPONDING PORTIONS |
|---|---|---|---|---|---|---|---|---|---|---|---|
| 1 | 1 | 0 | 0 | 1 | 0 | 7 | + | 0 | − | 10 | ① |
| 2 | 2 | 0 | 0 | 0 | 0 | 0 | 0 | 0 | 0 | 0 | POINT A |
| 3 | 1 | 1 | 0 | 0 | 0 | 1 | + | 5 | − | 9 | |
| 4 | 1 | 1 | 0 | 0 | 0 | 2 | + | 5 | − | 8 | ② |
| 5 | 1 | 1 | 0 | 0 | 0 | 1 | + | 5 | − | 9 | |
| 6 | 1 | 1 | 0 | 0 | 0 | 2 | + | 5 | − | 8 | |
| 7 | 1 | 1 | 0 | 0 | 0 | 2 | − | 10 | + | 0 | ③ |
| 8 | 1 | 1 | 0 | 0 | 0 | 6 | + | 0 | + | 10 | ④ |
| 9 | 1 | 1 | 0 | 0 | 0 | 1 | + | 1 | + | 10 | |
| 10 | 1 | 1 | 0 | 0 | 0 | 1 | + | 4 | + | 9 | |
| 11 | 1 | 1 | 0 | 0 | 0 | 1 | + | 6 | + | 8 | ⑤ |
| 12 | 1 | 1 | 0 | 0 | 0 | 1 | + | 8 | + | 7 | |
| 13 | 1 | 1 | 0 | 0 | 0 | 1 | + | 11 | + | 5 | |
| 14 | 1 | 1 | 0 | 0 | 0 | 1 | + | 9 | − | 1 | |
| 15 | 1 | 1 | 0 | 0 | 0 | 1 | + | 9 | − | 2 | |
| 16 | 1 | 1 | 0 | 0 | 0 | 1 | + | 10 | − | 1 | ⑥ |
| 17 | 1 | 1 | 0 | 0 | 0 | 1 | + | 10 | − | 2 | |
| 18 | 1 | 1 | 0 | 0 | 0 | 1 | + | 10 | − | 1 | |
| 19 | 1 | 1 | 0 | 0 | 0 | 1 | + | 12 | − | 2 | |

| SEQUENCE NO | TYPE OF CONTROL | START | THREAD CUT | STOP AT UPPER DEAD CENTER | STOP AT LOWER DEAD CENTER | NO OF NEEDLE RECIPROCATIONS | DIRECTION OF MOVEMENT ALONG X AXIS | AMOUNT OF MOVEMENT ALONG X AXIS | DIRECTION OF MOVEMENT ALONG Y AXIS | AMOUNT OF MOVEMENT ALONG Y AXIS | CORRESPONDING PORTIONS |
|---|---|---|---|---|---|---|---|---|---|---|---|
| 20 | 1 | 1 | 0 | 0 | 0 | 2 | + | 0 | − | 10 | ⑦ |
| 21 | 1 | 0 | 0 | 1 | 0 | 3 | + | 0 | − | 10 | ⑧ |
| 22 | 1 | 1 | 0 | 0 | 0 | 1 | + | 7 | − | 8 | |
| 23 | 1 | 1 | 0 | 0 | 0 | 1 | + | 5 | − | 8 | |
| 24 | 1 | 1 | 0 | 0 | 0 | 1 | + | 1 | − | 10 | ⑨ |
| 25 | 1 | 1 | 0 | 0 | 0 | 1 | − | 2 | − | 10 | |
| 26 | 1 | 1 | 0 | 0 | 0 | 1 | − | 6 | − | 9 | |
| 27 | 1 | 1 | 0 | 0 | 0 | 1 | − | 5 | − | 7 | |
| 28 | 1 | 1 | 0 | 0 | 0 | 6 | − | 5 | − | 0 | ⑩ |
| 29 | 1 | 0 | 1 | 1 | 0 | 8 | − | 8 | + | 15 | ⑪ |
| 30 | 1 | 0 | 0 | 1 | 0 | 1 | − | 6 | + | 12 | |
| 31 | 3 | 0 | 0 | 1 | 0 | 0 | 0 | 0 | 0 | 0 | STOP |

| TYPE OF CONTROL | | X-PROM BIT 7 | 6 |
|---|---|---|---|
| DATA REGARDING AMOUNT OF MOVEMENT | 1 | 0 | 0 |
| DATA REGARDING NUMBER OF OPERATIONS | 1 | 0 | 1 |
| OPTIONAL STOP | 2 | 1 | 0 |
| STOP | 3 | 1 | 1 |

FIG. 20

| BIT ADDRESS | TYPE OF CONTROL (7 6) | CONTROL SIGNAL (5 4 3 2) | X SIGNE (1) | X DATA OR NUMBER OF OPERATIONS (0 7 6 5) | Y SIGNE (4) | Y DATD OR NUMBER OF OPERATIONS (3 2 1 0) | CORRESPONDING PORTIONS |
|---|---|---|---|---|---|---|---|
| 0 | 1 1 | 0 0 0 0 | 0 | 0 0 0 0 | 0 | 0 0 0 0 | |
| 1 | 0 1 | 0 0 1 0 | 0 | 0 0 0 0 | 0 | 0 1 1 1 | ① |
| 2 | 0 0 | 0 0 1 0 | 0 | 0 0 0 1 | 1 | 1 0 1 0 | |
| 3 | 1 0 | 0 0 0 0 | 0 | 0 0 0 0 | 0 | 0 0 0 0 | POINT A |
| 4 | 0 0 | 1 0 0 0 | 0 | 0 0 0 0 | 0 | 0 0 0 0 | |
| 5 | 0 0 | 1 0 0 0 | 0 | 1 0 1 1 | 1 | 1 0 0 1 | |
| 6 | 0 1 | 1 0 0 0 | 0 | 0 0 0 0 | 0 | 0 0 1 0 | ② |
| 7 | 0 0 | 1 0 0 0 | 0 | 1 0 1 1 | 1 | 1 0 0 0 | |
| 8 | 0 0 | 1 0 0 0 | 0 | 1 0 1 1 | 1 | 1 0 0 1 | |
| 9 | 0 1 | 1 0 0 0 | 0 | 0 0 0 0 | 0 | 0 0 1 0 | |
| 10 | 0 0 | 1 0 0 0 | 0 | 1 0 1 1 | 1 | 1 0 0 0 | |
| 11 | 0 1 | 1 0 0 0 | 0 | 0 0 0 0 | 0 | 0 0 1 0 | ③ |
| 12 | 0 0 | 1 0 0 0 | 1 | 1 0 1 0 | 0 | 0 0 0 0 | |
| 13 | 0 1 | 1 0 0 0 | 0 | 0 0 0 0 | 0 | 0 1 1 0 | ④ |
| 14 | 0 0 | 1 0 0 0 | 0 | 0 0 0 0 | 1 | 1 0 1 0 | |
| 15 | 0 0 | 1 0 0 0 | 0 | 0 0 1 0 | 1 | 1 0 1 0 | |
| 16 | 0 0 | 1 0 0 0 | 0 | 1 0 0 0 | 1 | 1 0 0 1 | |
| 17 | 0 0 | 1 0 0 0 | 0 | 1 1 0 0 | 1 | 1 0 0 0 | ⑤ |
| 18 | 0 0 | 1 0 0 0 | 0 | 1 0 0 0 | 0 | 0 1 1 1 | |
| 19 | 0 0 | 1 0 0 0 | 0 | 1 1 0 0 | 0 | 0 1 0 1 | |
| 20 | 0 0 | 1 0 0 0 | 0 | 1 0 0 1 | 1 | 0 0 0 1 | |
| 21 | 0 0 | 1 0 0 0 | 0 | 1 0 0 1 | 1 | 0 0 1 0 | |
| 22 | 0 0 | 1 0 0 0 | 0 | 1 0 1 1 | 0 | 0 0 0 1 | |
| 23 | 0 0 | 1 0 0 0 | 0 | 1 0 1 1 | 0 | 0 0 1 0 | ⑥ |
| 24 | 0 0 | 1 0 0 0 | 0 | 1 0 1 1 | 0 | 0 0 0 1 | |
| 25 | 0 0 | 1 0 0 0 | 0 | 1 1 0 0 | 1 | 0 0 1 0 | |
| 26 | 0 1 | 1 0 0 0 | 0 | 0 0 0 0 | 0 | 0 0 1 0 | ⑦ |
| 27 | 0 0 | 1 0 0 0 | 0 | 0 0 0 1 | 1 | 1 0 1 0 | |
| 28 | 0 1 | 0 0 1 0 | 0 | 0 0 0 0 | 0 | 0 0 1 1 | ⑧ |
| 29 | 0 0 | 0 0 1 0 | 0 | 0 0 0 1 | 1 | 1 0 1 0 | |
| 30 | 0 0 | 1 0 0 0 | 0 | 0 0 0 0 | 0 | 0 0 0 0 | |
| 31 | 0 0 | 1 0 0 0 | 0 | 1 1 1 1 | 1 | 1 0 0 0 | |
| 32 | 0 0 | 1 0 0 0 | 0 | 1 0 1 1 | 1 | 1 0 0 0 | |
| 33 | 0 0 | 1 0 0 0 | 0 | 0 1 1 1 | 1 | 1 0 1 0 | ⑨ |
| 34 | 0 0 | 1 0 0 0 | 1 | 0 0 1 0 | 1 | 1 0 1 0 | |
| 35 | 0 0 | 1 0 0 0 | 1 | 0 1 1 0 | 1 | 1 0 0 1 | |
| 36 | 0 0 | 1 0 0 0 | 1 | 0 1 1 1 | 0 | 1 1 1 1 | |
| 37 | 0 1 | 1 0 0 0 | 0 | 0 0 0 0 | 0 | 0 1 1 1 | ⑩ |
| 38 | 0 0 | 1 0 0 0 | 1 | 0 1 0 1 | 0 | 0 0 0 0 | |
| 39 | 0 1 | 0 1 1 0 | 0 | 0 0 0 0 | 0 | 1 0 0 0 | ⑪ |
| 40 | 0 0 | 0 0 1 0 | 1 | 1 0 0 0 | 0 | 1 1 1 1 | |
| 41 | 0 0 | 0 0 1 0 | 1 | 0 1 1 0 | 0 | 1 1 0 0 | |
| 42 | 1 1 | 0 0 1 0 | 0 | 0 0 0 0 | 0 | 0 0 0 0 | STOP |

AUTOMATIC SEWING MACHINE

BACKGROUND OF THE INVENTION

This invention relates to an automatic sewing machine, more particularly to a control system of a sewing machine capable of performing profile sewing operations.

It is a recent trend for automating the sewing operation of parts of clothes having predetermined profiles such as neckes, pocket covers, sleeves, darts, etc. and certain types of numerically controlled sewing machine are now avaiadble on the market. However, in such automatic sewing machines, the control system and programming are extremely complicated, expensive and difficult to operate.

SUMMARY OF THE INVENTION

It is an object of this invention to provide an automatic sewing machine with an improved control system capable of obviating the difficulties described above particularly by inducting a parameter regarding the number of operations.

Another object of this invention is to provide an improved control system for an automatic sewing machine in which it is not necessary to use an accurately machined profile platen or cam for performing a profile sewing.

Still another object of this invention is to provide a novel control system for an automatic sewing machine in which operation sequences of a program for a predetermined profile to be sewed are prepared in terms of the numbers of pulses by analyzing the curves, straight lines, etc. of the profile, the program is stored in a memory device, and the sewing operation is controlled by reading the stored program.

According to this invention, there is provided an automatic sewing machine comprising a stationary table, a head of the sewing machine mounted on the stationary table and including a needle and driving means for vertically reciprocating the needle, a support carrying a clamping member adapted to clamp a cloth to be sewed, a pair of pulse motors for moving the support to any position in a plane defined by X and Y rectangular coordinate axes, and a control system for supplying driving pulses to the pulse motors for sewing the cloth according to a seam of a predetermined profile, and for supplying control signals to the driving means for vertically moving said needle and stopping the needle at the upper or lower dead center; said control system including a memory device in which informations regarding the numbers of the pulses required to drive the pulse motors for moving the support in the X and Y directions of rectangular coordinates by one sewing pitch and regarding repeated numbers of the sewing pitch in these directions. said pulses being produced by converting the profile into the amounts of movements in the X and Y directions, and informations commanding the starting of the sewing operation, thread cutting, vertical reciprocation of the needle and stopping of the needle at the upper or dead center are stored in the form of binary codes and according to the sequences of the sewing operation; a timing pulse generator for generating a timing pulse which determines the timing of reading the informations stored in the memory device; an address counter operated by the timing pulse generated by the timing pulse generator for designating the address of an information to be read; an address condition gate circuit operating to determine whether the information at a new address of the memory device is to be read or the information at the same address is to be read repeatedly; and counter means for processing the read out informations to determine the amounts of movements of the support in the X and Y directions and to set the number of repeated operations.

BRIEF DESCRIPTION OF THE DRAWINGS

The organization and operation of this invention can be more fully understood from the following detailed description taken in conjunction with the accompanying drawings in which:

FIG. 5 is a graph showing one example of the addresses of a PROM and a variety of patterns stored therein.

FIG. 6A shows the circuit of an address gate circuit;

FIG. 6B shows waveforms for explaining the operation of the address gate shown in FIG. 6A;

FIG. 7 is a block diagram showing an address counter;

FIG. 9 shows a circuit diagram of a decoder;

FIG. 10 is a block diagram showing a counter;

FIG. 12 is a connection diagram showing an address condition gate circuit;

FIG. 13 shows a pulse generator;

FIG. 19 is a table showing fundamental data utilized to prepare programs; and

FIG. 20 shows a data sheet showing logical values utilized to be written in a PROM.

DESCRIPTION OF THE PREFERRED EMBODIMENT

Figure 1:
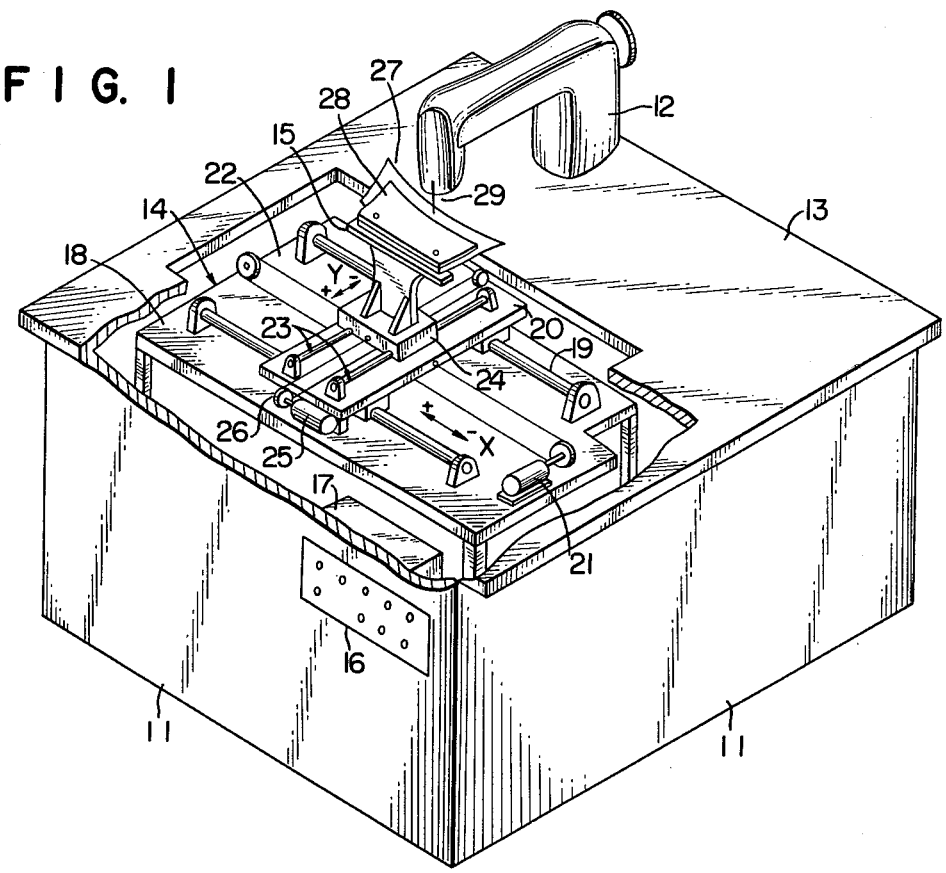
FIG. 1 is a perspective view of an automatic sewing machine embodying the invention.

An automatic sewing machine of this invention shown in FIG. 1 comprises a main body 12 or head mounted on a table 13 overlying a rectangular frame 11. The table 13 is provided with a rectangular opening at about the center thereof to receive upwardly projecting cloth clamping member 15 of a X-Y direction driving member 14 located beneath the table. Thus, the clamping member 15 may be moved to any position in the opening. A control panel 16 containing a control system 17 to be described later is mounted on one side of the frame 11.

The X-Y direction driving member 14 comprises a X-table 20 sliding along X direction guide rods 19 mounted on a sub-table 18, a X pulse motor 21 and a wire belt 22 for driving table 20 in the X direction, Y direction guide rods 23 mounted on the X-table 20, a Y table 24 sliding along Y direction guide rods 23, a Y pulse motor 25 and a wire belt 26 for driving the Y table in the Y direction. On the Y table 24 is secured a support 15 carrying a pair of cloth clamping members 28 adapted to clamp a cloth 27 to be sewed therebetween. Y and X tables 24 and 20 are driven by respective pulse motors 25 and 21 so as to sew the portion of the cloth on the outside of the cloth clamping members 28 by means of a needle 29.

Where the X and Y tables of light weights are used it is possible to use pulse motors of a small rating.

Figure 2:
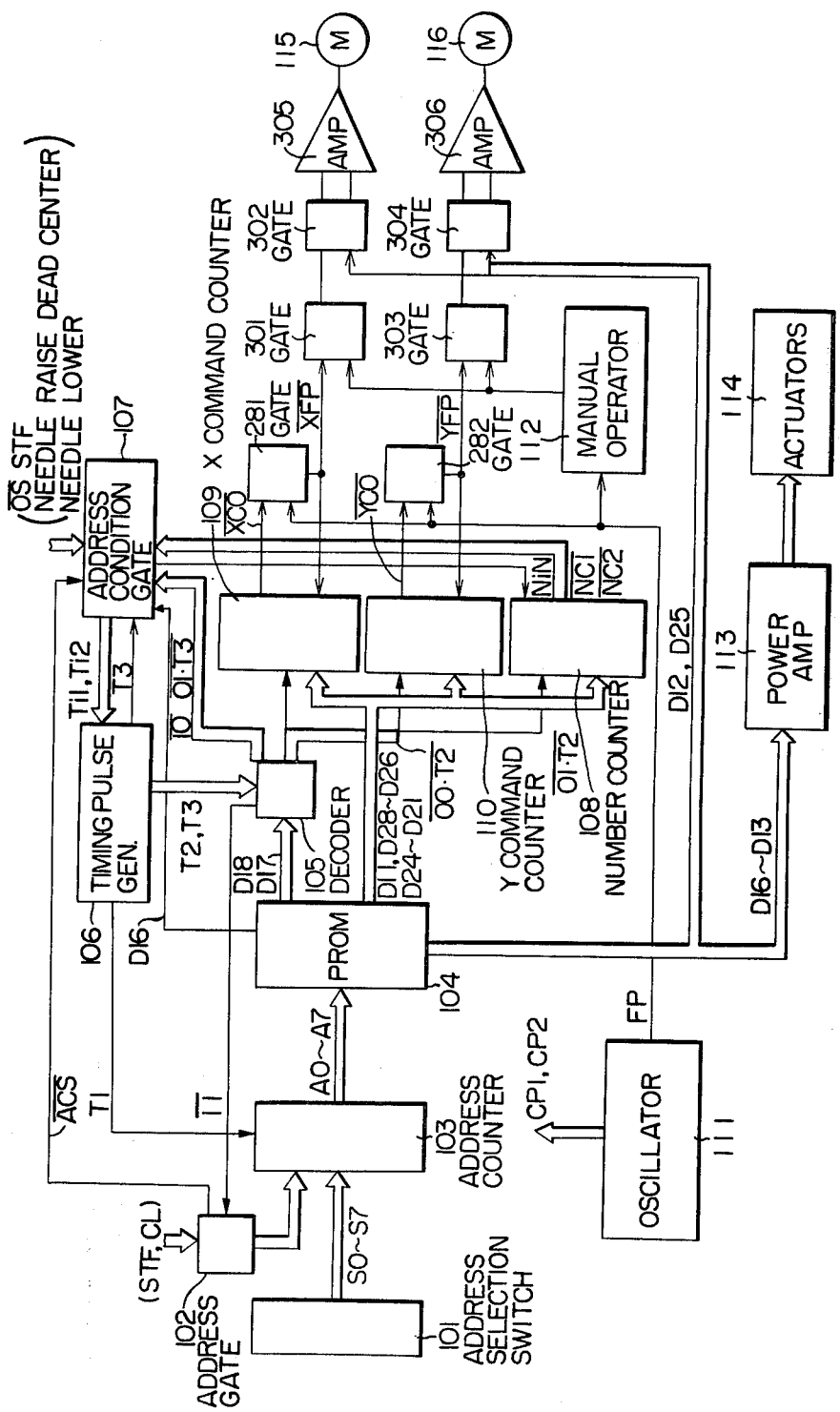
FIG. 2 is a block diagram showing the control system of this invention.

The control system is shown in FIG. 2. Before describing it in detail, some items necessary to be cleared for the better understanding of the control system will firstly be described.

DATA FORMAT ON THE RECORDING MEDIUM

Figure 3:
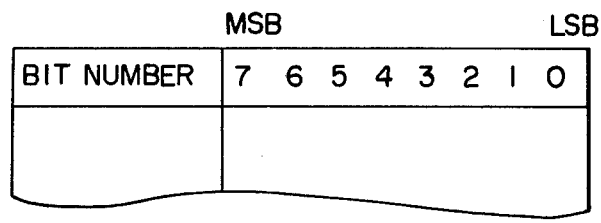
FIG. 3 shows one example of the bit pattern of the memory device of a PROM (programmable read only memory)

Various types of the recording medium can be used such as a PROM (programmable read only memory), a core memory, a wire memory, a magnetic card, a paper tape, and a magnetic tape. However, in the following description, a PROM is used. Although there are many types of PROM, in this example, it is assumed that the number of bits that can be designated by one address is eight. One example of the PROM of this type comprises C1702A sold by Intel Company. However, it should be understood that any type of the PROM can be used in the control system of this invention.

Where a PROM that derives out a 8 bit data from one address is used two identical PROMs are used. For example, two such PROMs are connected in parallel so as to take out a 16 bit data by a single address designation. One PROM which is used to store data regarding control is termed PROM-1 and the other PROM which is used to store the data regarding the movement in the axial direction is termed PROM-2. Further, the least significant bit (LSB) of each PROM is herein termed the 0th bit, the most significant bit (MSB) that is, the 7th bit and intermediate bits are termed the first to 6th bits, as shown in FIG. 3. The detail of the data to be written in the PROM-1 and PROM-2 is as follows.

(I) Type of the Control

Data representing the type of the control are stored in the 6th and 7th bits of PROM-1. There are four types of the control as follows:

(1) Where the 7th and 6th bits are "0" and "0".

In this case, the next data is stored in other bits. For example, a sewing machine control signal is stored in the 5th to second bits of PROM-1. Thus:

| | |
|---|---|
| 5th bit | → sewing machine stop |
| 4th bit | → thread cut |
| 3rd bit | → stop at the upper dead center |
| 2nd bit | → stop at the lower dead center |
| 1st bit of PROM-1 | → direction of movement of the X axis |
| 0th bit of PROM-1 and 7th to 5th bits of PROM-2 | → Amount of movement of the X axis (max. 15 pulses) or the number of reciprocations of the needle |
| 4th bit of PROM-2 | → direction of movement of the Y axis |
| 3rd to 0th bits of PROM-2 | → amount of movement of the Y axis (maximum 15 pulses) or the number of reciprocations of the needle. |

(2) Where the 7th and 6th bits are "0" and "1".

This case represents the number of reciprocations of the needle where the unit movements of X and Y axes are equal. The data regarding the number of reciprocations of the needle is stored in the form of a BCD (binary code decimal) of two orders, and the upper digit of BCD is stored in the 0th bit of PROM-1 and the 7th to 5th bits of PROM-2 that is in the same bits for the amount of movement of the X axis whereas the lower digit of BCD is stored in the 3rd to 0th bit of PROM-2, that is in the same bits for the amount of movement of the Y axis. The maximum number is 99. The control of the main body is effected by the sewing machine control signal described above.

(3) Where the 7th and 6th bits are "1" and "0".

This case means an optional stop of the axis.

Then, when this signal is read when an optional stop switch of the control panel 16 (FIG. 1) is ON the movement of the axis stops.

In this case too, the control of the main body of the sewing machine is performed by the sewing machine control signal.

(4) Where the 7th and 6th bits are "1" and "1".

In this case, a stop signal is generated and the machine stops. Again, the control of the main body is performed by the sewing machine control signal.

(II) Sewing Machine Control Signal

The data regarding the sewing machine control is stored in four bits of from the 5th to 2nd bits. For example, a start-stop information of the needle is stored in the 5th bit. When the data read out is "1" the needle is started whereas when the data is "0" the needle is stopped.

In the same manner, a thread cut signal and the data regarding the stop at the upper dead center and the stop at the lower dead center are stored in the 4th and 3rd bits in the form of "1" or "0". By reading these data it is possible to control various functions of the main body. With regard to the thread cut, and stopping of the thread at the upper and lower dead centers, after a completion signal has been produced by the main body, the control is advanced to the succeeding step. (for example, by using a limit switch).

(III) Data Regarding the Direction of Movement

The data regarding the direction of movement of the axis are stored in the 1st bit of PROM-1 and the 4th bit of PROM-2. When these bits are "0" the cloth clamping member 15 is moved in the positive (forward) direction along X and Y axes whereas when these bits are "1" the cloth clamping member 15 is moved in the negative (rearward) direction.

(IV) The Data Regarding the Amount of Movement of the Axis or the Number of Revolutions The data regarding the amount of movement of the axis and the number of revolutions are stored respectively in the 0th bit of PROM 1 and in the 7th to 5th bits of PROM-2. The discrimination between the data regarding the amount of movement and the data regarding the number of revolutions is made in accordance with the data in the 7th and 6th bits of PROM-1 which represent the type of control.

Figure 4:
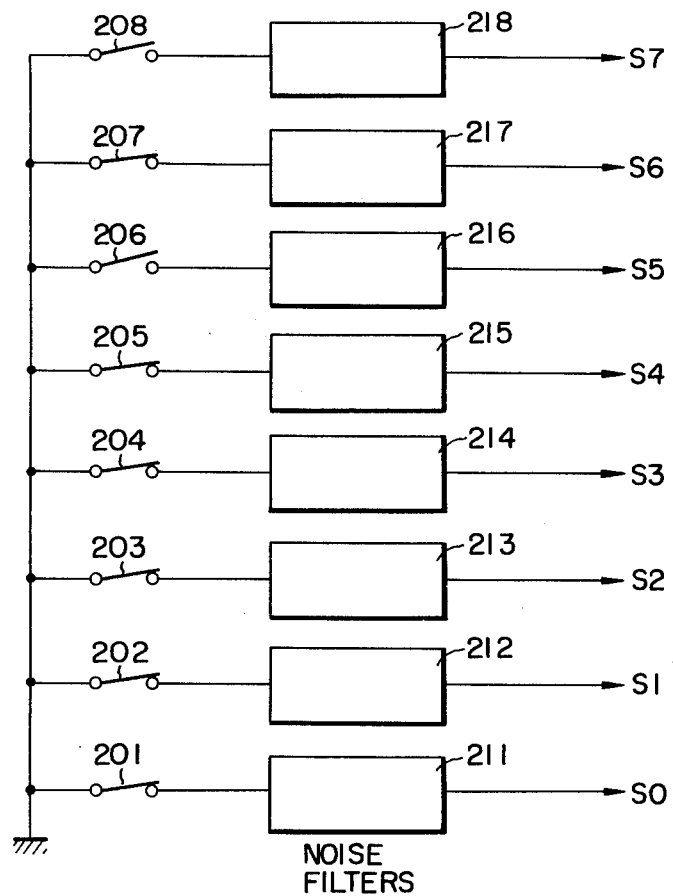
FIG. 4 is a connection diagram showing the address selection switch circuit.

Having completed the preliminary description, the control system shown in FIG. 2 will now be described. There is provided an address selection switch 101. As shown in detail in FIG. 4, it comprises 8 switches 201 through 208 (which may be snap switches or push button switches) for producing 8 bit signals S0 through S7 via noise filters 211 through 218. Signals S0 through S7 are used to select the first or leading address of a desired program among a plurality of pattern programs stored in PROM-1 and PROM-2. Switches 201 through 208 are used to select any desired address (when expressed by decimal numbers from 0 to 255) of the address from 0000 0000 to 1111 1111 represented by 16 digits of two orders of magnitude, by the selective operation of these switches.

Accordingly, where a number of programs are stored in a pair of PROMs, it is necessary to store the leading address of each program for the purpose of discriminating respective programs.

FIG. 5 shows the relationship between pattern programs stored in respective PROMs and the addresses specific thereto. As shown in FIG. 5 the data of the collar of a white shirt is stored in the addresses 50 to 90 of PROM (a) whereas in the PROM(b) in the addresses 100 to 140. In this case, to designate a collar by PROM (a) the selection switch 101 should select address 50 and to designate the collar by PROM (b) the address 100 should be selected.

The control system shown in FIG. 2 also comprises an address gate circuit 102 which is used to determine the condition for setting an address selected by the address selection switch 101 in an address counter 103 to be described later.

FIG. 6A shows one example of the address gate circuit 102 comprising a NAND gate circuit 221, inverters 222, 226 and 227, and NOR gate circuits 223, 224 and 225, connected as shown.

Upon receiving a clear signal CL, the address counter reset signal ACR turns to "1" thereby resetting the address counter 103. Then CL = 0. Where the type of the control is NO.11 (7th and 6th bits of PROM-1), the NAND gate circuit 221 is enabled each time a start signal STF = 1 is given when signal $\overline{11} = 0$ whereby the address counter 103 is reset. Similarly, the output from NAND gate circuit 221 is coupled to the NOR gate circuit 223 to set the address counter ($\overline{ACS} = 0$). However, as shown in FIG. 6B, since the signal CP2 is applied later than a clock pulse CP1, the address counter 103 is reset by depressing a start button when signal $\overline{11} = 0$ is read, and after receiving the next clock pulse the state of the address selection switch 101 is loaded. A signal $\overline{ACS}$ for setting the address counter is applied to an address condition gate circuit (to be described later) to use the signal for reading the content of a PROM whose address has been selected. As shown in FIG. 6B, the start signal applied to the address gate circuit 102 is converted into a pulse in synchronism with the clock pulse CP2. When the address counter 103 is cleared the 0th address of the PROM 104 is designated so that it is necessary to store type No.11 of the control in the 0th address to restart the operation by the start switch.

The detail of the address counter 103 is shown in FIG. 7. As shown, it comprises 4 bit binary counters 231 and 232 (for example SN74193 sold by TI company) which are connected in cascade.

Signals 50 through 57 from the address selection switching circuit 101 are applied to input terminals A-D of respective binary counters. When the address counters is set ($\overline{ACB} = 0$) these signals are loaded in the binary counters to produce output signals A0 through A7. When the address counter resets signal ACR is applied to the clear terminals of respective binary counters.

A pulse signal T1 generated by a timing pulse generator 106 is applied to the count up terminal of the binary counter 231 so that the values of the output signals A0 through A7 are increased stepwisely each time the pulse signal is applied. The output signals A0 through A7 from the address counter 103 are applied to the address terminals of the next PROM 104.

Figure 8:
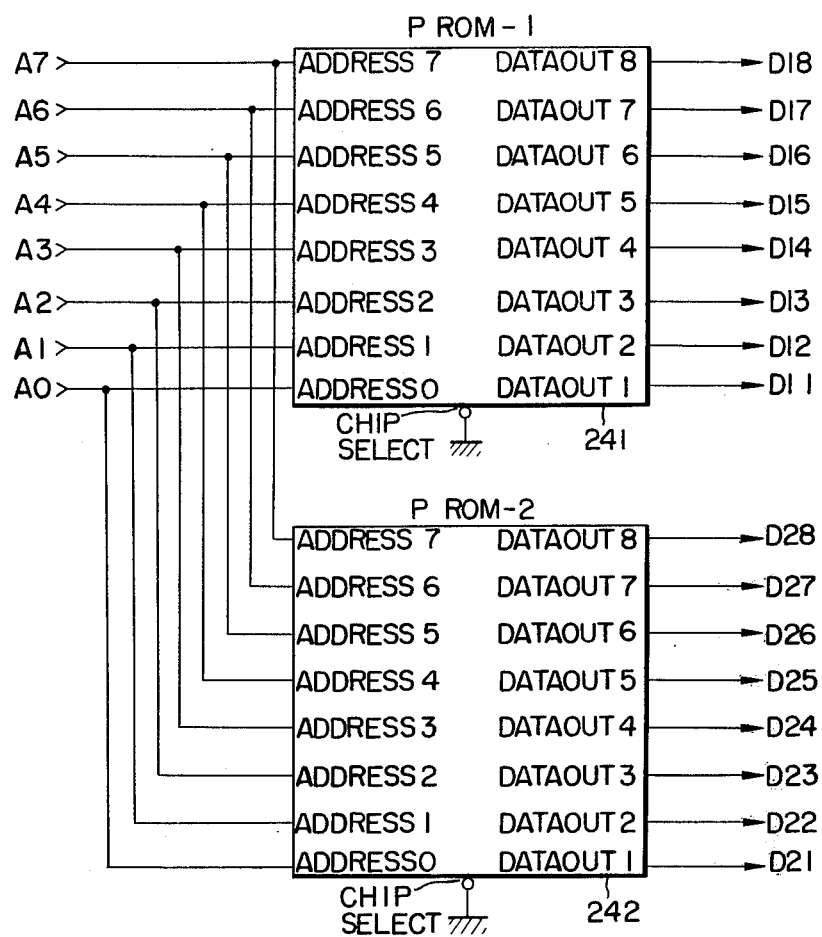
FIG. 8 is a block diagram showing the connection of PROM-1 and PROM-2.

FIG. 8 shows the detail of PROM 104 which comprises PROM-1 (241) and PROM-2 (242) having respective address terminals 0 through 7 connected in common, thus making it possible to designate the address by the output A0 through A7 from the 8 bit address counter. Accordingly, when address is designated 16 bit output signals D11 through D18 and D21 through D28 are produced. The chip select terminals are grounded so as to normally provide the data of the designated address. The contents of the output signals D11 through D18 and D21 through D25 are shown in the following Table 1.

Table 1

| PROM number | bit number | D11 – D28 | content |
|---|---|---|---|
| PROM-1 | 7,6 | D18, D17 | type of control |
| | 5 | D16 | start sewing operation |
| | 4 | D15 | thread cut |
| | 3 | D14 | stop at upper dead center |
| | 2 | D13 | stop at lower dead center |
| | 1 | D12 | +, − in X direction |
| | 0 | D11 | ⎫ |
| | 7 | D28 | ⎬ amount of movement in X direction |
| PROM-2 | 6 | D27 | ⎭ |
| | 5 | D26 | |
| | 4 | D25 | +, − in Y direction |
| | 3 | D24 | ⎫ |
| | 2 | D23 | ⎬ amount of movement in Y direction |
| | 1 | D22 | |
| | 0 | D21 | ⎭ |

The control system shown in FIG. 2 also comprises a decoder 105 connected to the PROM 104 for decoding control types D18 and D17. The detail of this decoder is shown in FIG. 9 and it comprises inverters 251 and 252 and NAND gate circuits 253 through 257. Pulse signals T2 and T3 from a timing pulse generator 106 and signals D16 and D18 are applied to the inputs of the decoder 105 and the decoder produces five outputs $\overline{11}$, $\overline{10}$, $\overline{01.T3}$, $\overline{01.T2}$ and $\overline{00.T2}$.

Of these outputs, output signal $\overline{11}$ represents the termination of the program and is applied to the address gate circuit 102, while the output signal $\overline{10}$ is combined with the output signal from an optional stop switch by an address condition gate circuit 107 to be described later for determining that whether the operation of the machine should be continued or stopped according to the condition of the optional stop switch thus determining whether the next address should be read or not. More particularly, the address condition gate circuit 107 operates such that the machine is stopped when the optional stop switch is ON whereas the next address of the PROM is read when the optional stop switch is OFF thereby advancing the address by one.

The output signal $\overline{01.T3}$ is used to store the data regarding the number of operations in a counter 108 and then to form a signal which is used to advance by one the address counter 103.

The output signal $\overline{01.T2}$ is used to open the gate circuit of the counter 108 for storing therein data D11, D28–D26 and D24–D21 at the 0th bit of PROM-1, and 7th–5th bits of PROM-2, and 3rd to 0th bits of the same PROM.

The output signal $\overline{00.T2}$ becomes "0" when the 7th and 6th bits of PROM-1 are 00, that is D18 = 0 and D17 = 0 and when the timing pulse is T2, thus opening the gate circuit of X and Y command counters 109 and 110. When the gate circuit is opened signals D11, D28, D27 and D26 are stored in the X command counter 109 and signals D24, D23, D22 and D21 in the Y command counter 110.

The counter 108 is used to set the number of repeating operations when the cloth is moved so as to sew or not sew it according to the same data regarding the movement of the cloth (the set values of X and Y command counters 109 and 110). FIG. 10 shows the detail of counter 108 comprising a pair of BCD counters 261 and 262 with the count down terminal of counter 262 connected with the borrow terminal of the counter 261, inverters 263–266 and 267–270 and NAND gate circuits 271 and 272.

As above described in response to signal $\overline{01.T2}$ = 0 the data representing the number of operations D11, D28, D27, D26, D24, D23, D22 and D21 are stored in the counter 108 and then produced at the output terminals thereof. The content of the counter is subtracted each time a signal NiN formed by the address condition gate circuit 107 is received. When the outputs of respective BCD counters 261 and 262 are zero, conditions $\overline{NC1}$ = 0 and $\overline{NC2}$ = 0 hold. As described above, the signal NiN is prepared by the address condition gate circuit 107 when $\overline{NC1}$, $\overline{NC2}$ = 0, and when the counts of both X and Y command counters 109 and 110 are zero.

Signals $\overline{NC1}$ and $\overline{NC2}$ are applied to the address condition gate circuit 107 to provide a condition necessary to prepare signal NiN as well as the timing signal.

The X and Y command counters 109 and 110 are shown in FIG. 2. When the output signal $\overline{00.T2}$ from decoder 105 is zero, signals D11, D28, D27 and D26 are stored in X command counter 109, whereas signals D24, D23, D22 and D21 in the Y command counter 110. The values of respective axes (BCD values) correspond to the number of pulses for moving the X and Y axes, respectively designated by the address at that time.

Figure 11:
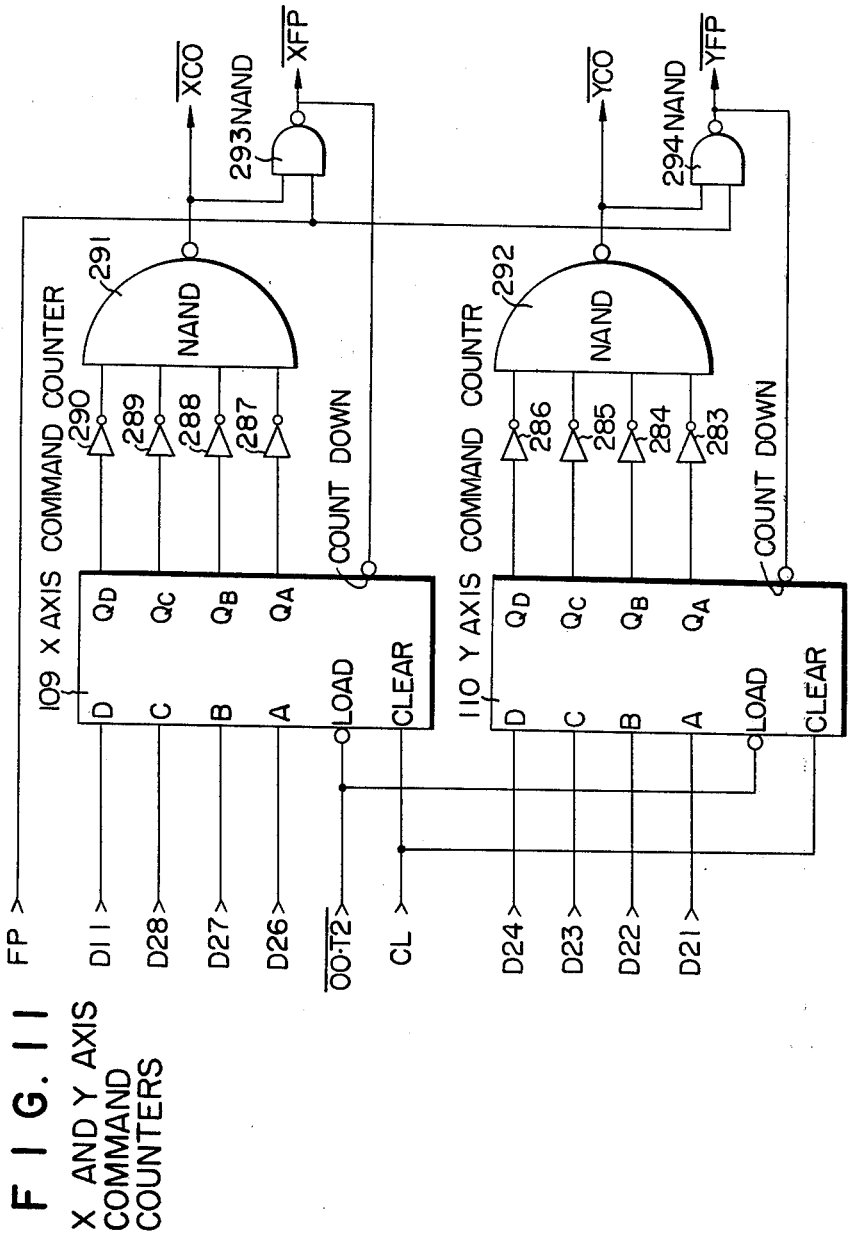
FIG. 11 is a block diagram showing X and Y axes command counters.

FIG. 11 shows the detail of X and Y command counters 109 and 110 which are provided with NAND gate circuits 291 and 292 (see FIG. 2), inverters 283 through 286 and 287 through 290, and NAND gate circuits 293 and 294. Accordingly, when the data other than zero are applied to counters 109 and 110 signal $\overline{XCO}$ = 1 or $\overline{YCO}$ = 1 is produced so that a feed pulse EP supplied by an oscillator 111 produces a feed pulse signals $\overline{SFP}$ and $\overline{YFP}$ through NAND gate circuit 293 or 294. These feed pulse signals are applied to the count down terminals of respective counters 109 and 110 to subtract their contents. Further, as shown in FIG. 2, these feed pulse signals $\overline{XFP}$ and $\overline{YFP}$ are also supplied to pulse motor amplifiers 305 and 306 via gate circuits 301, 302 and gate circuits 303, 304 respectively for driving pulse motors 115 and 116 in desired directions. For determining the direction of rotation, signals D12 and D25 are sent to gate circuits 302 and 304 from PROM 104.

As shown in FIG. 2, a manual operator 112 is provided for switching the feed pulses to the pulse motors 115 and 116 by the gate circuits 301 and 303. More particularly, the manual operator 112 is constituted by a combination of a transfer switch, a push button and a gate circuit for enabling manual positioning of the first work. As the transfer switch may be used a manual-automatic transfer switch, a rapid-one pulse transfer switch, an X-Y axis selection switch or a direction selection switch. The push button switch may include a start button, a stop button, and a clear button. For the manual operation, the manual-automatic transfer switch is thrown to the manual side and then the other switches are operated for positioning the X and Y tables at any positions within a predetermined stroke.

PROM 104 produces sewing machine control signals D16, D14 and D13, the "1" and "0" or ON and OFF states of these signals displaying the driving and non-driving of various component elements of the sewing machine, for example raising and lowering movements of the needle, and the thread cutting. Signals D16–D13 and amplified by a power amplifier 113 for operating various actuators (for example an electromagnetic clutch) contained in the main body.

The address condition gate circuit 107 shown in FIG. 2 operates in response to such states as the states $\overline{NC1}$, $\overline{NC2}$) of the counter 108, the states ($\overline{XCO}$, $\overline{YCO}$) of the X and Y command counters 107 and 110, the contents ($\overline{10}$, $\overline{01 \, T3}$, D16) which are read from PROM 104 as well as the states of the main body and the operating switch (needle raising at a dead center, reciprocation of the needle, the optional stop switch OS, and start switch STF) and the state of the automatic signal AUTO for determining whether the address of PROM 104 is to be advanced by one to read the data or to read the data of the same address without advancing the address.

The conditions of these two cases are:

(I) A case wherein the data is read by advancing the address.

(1) Under the conditions wherein the type $\overline{10}$ of the control is "0", the optional stop switch is OFF, that is $\overline{OS}$ = 1 and T3 is "1". Then the optional stop switch is OFF so that even when the type $\overline{10}$ of the control is 0, the advance of the address must be continued to designate the next address.

(2) When the type of the control $\overline{10}$ = 0, and the optional stop switch is ON, and when the start button is depressed, the advance is stopped once. But when the start button is depressed for restarting, the address must be advanced.

(3) At $\overline{01.T3}$ = 0, it is necessary to set the data regarding the number of operations in the counter 108 and then advance the address by one.

(4) Where all of counters 108 and command counters 109 and 110 count out and (a) when the sewing machine start signal in the 5th bit of PROM-1 is "0" and the signal reaches when the needle is at a dead center, the X and Y tables are moved without performing any sewing operation.

(b) when the start signal is "1" and a needle idle signal is received (this signal is produced when the needle is raised above the cloth), to assure accurate sewing, the X and Y tables are fed intermittently and while the needle is piercing through the cloth the X and Y tables and hence the cloth are not fed.

When either one of the conditions (1) (2) (3) and (4)a, (4)b holds, upon applying the AUTO signal, it is necessary to advance the address for reading the data.

(II) A case wherein the data of the same address is repeatedly read without advancing the address.

(1) When the type of the control 11 and the start button is depressed. Under these conditions, after resetting the address counter an address selected by the address selection switch 101 is set in the address counter 103. But it is necessary to read the content of the PROM 104 corresponding to the address selected thereafter.

(2) When two command counters 109 and 110 are in the count out states but the number counter 108 is not in the count out state and (a) when the start signal at the 5th bit (D16) of PROM-1 is "0" and a signal indicating that the needle is at the upper dead center is received.

(b) when the start signal is "1" and a needle idle signal is received.

Where either one of the conditions (1) and (2)a and (2)b holds and an automatic signal AUTO is received, it is necessary to read the data without advancing the address.

FIG. 12 shows one example of an actual circuit that can fullfil the conditions (I) and (II). In the circuit shown in FIG. 12, when counter 108, and X and Y command counters are in their count out states signals $\overline{NC1}$, $\overline{NC2}$, $\overline{XCO}$ and $\overline{YCO}$ are respectively "0" whereas when the counters are not count out these signals are "1". Among the data 10, $\overline{01.T3}$ and D16 read from PROM 104, the data 10 and $\overline{01.T3}$ are the outputs of decoder 105 and become "0" or "1" when the conditions hold. The signal D16 is produced by PROM-1 and assumes "1" when the sewing machine starts and "0" when the machine stops. The pulse generating circuit 311 operates such that the signal representing the state of the machine is "1" when the needle is on the upper dead center, but "0" in other states. The signal representing the state of the needle is "1" when the needle is withdrawn from the cloth to the position thereabove and "0" in other positions. In other states, the output from the pulse generating circuit 311 is "0".

The state OS of the operating switch becomes "0" when the optional stop switch is ON but "1" when the optional stop switch is OFF. The state STF of the operational switch produces an "1" pulse synchronized with clock pulse CP2 when the start button is depressed.

In FIG. 12, reference numbers 312, 313 and 324 represent NOR gate circuits, 314, 318, 321, 322, 323 and 325 inverters, 315, 316, 317, 319, 320, 326, 327, 328, 329, 330, 331, 332 and 333 NAND gate circuits and 334 and 335 pulse generating circuits.

When the condition (I)-(1) is satisfied NAND gate circuit 316 is enabled whereby a conductor $a_1$ assumes "0" state. Similarly, when the condition (I)-(2) is satisfied, the NAND gate circuit 315 is enabled to change the state of conductor $a_1$ to "0". Where a signal $\overline{01T3} = 0$ is applied, the NAND gate circuit 317 produces an output "1" whereby the conductor $a_1$ becomes "0" and the output from NAND gate circuit becomes "1". When signal AUTO = 1, the NAND gate circuit 333 is enabled to produce a signal Ti1 from the pulse generating circuit 335.

Under the condition of (I)-(4)a, the NAND gate circuit 326 is enabled so that conductor a2 becomes "0".

In the case of (I)-(4)b, the NAND gate circuit 329 is enabled and a conductor a3 becomes "0". For this reason, when conductor a2 and a3 become "0", the output conductor a from the NAND gate circuit becomes "1" thus producing a pulse signal Ti1.

Further, as shown in FIG. 12, under the condition of (II)-(1), conductor b1 becomes "0" and the output conductor from NAND gate 330 becomes "1". Under the condition of (II)-(2)a the NAND gate circuit 327 is enabled, and the conductor b2 becomes "0". Accordingly, conductor b3 becomes "1". Thus, the NAND gate circuit 332 is enabled when signal AUTO = 1, thus generating a pulse signal Ti2 from the pulse generating circuit 334.

The pulse signals Ti1 and Ti2 are applied to the timing pulse generator 106 (FIG. 2). The inverter 321 applies signal NiN to the counter 105 to act as the counting pulse. The signal NiN becomes "1" when the NAND gate circuit 320 is enabled and when $\overline{XCO} = \overline{YCO} = 0$, at the time of counting out of the counter 108.

FIG. 13 shows one example of the pulse generating circuit 334 or 335 shown in FIG. 12. This circuit comprises synchronous flip-flop circuits 401 and 402. An input iN is coupled to the clock gate of the former and a clockpulse CP2 is coupled to the clock gate of the latter. The output $Q_1$ of the flip-flop circuit 401 is applied to the set terminal of the flip-flop circuit 402, and the output $Q_2$ of the flip-flop circuit 402 is coupled with the reset terminal of the flip-flop circuit 401. As shown by the waveforms on the right upper corner of FIG. 13 when the input iN, that is the output from the gate circuit 332 builds down, $Q_1 = 1$. Then, upon receiving clock pulse CP2, $Q_2 = 1$ and $\overline{Q2} = 0$ so that $Q_1 = 1$.

Figure 14A:
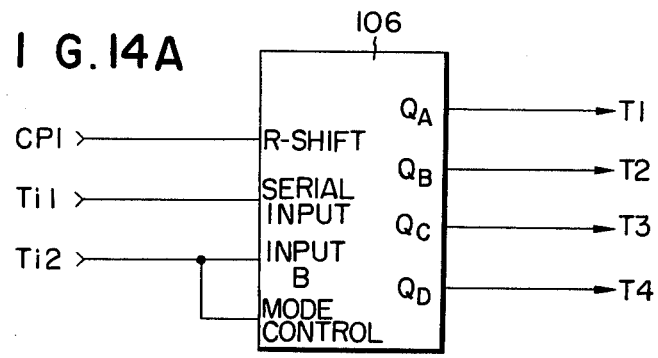
FIG. 14A shows a timing pulse generator.
Figure 14B:
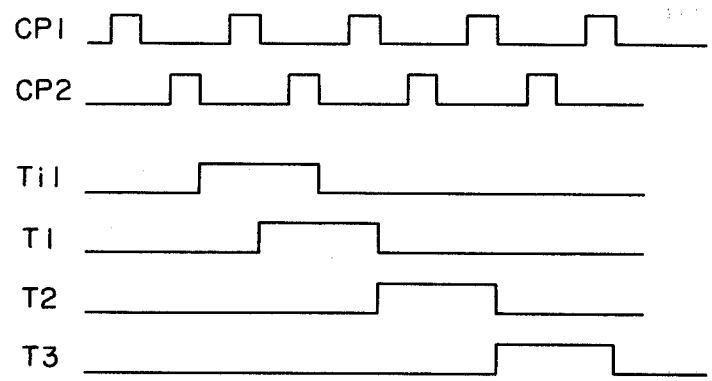
FIGS. 14B and 14C are waveforms to explain the operation of the timing pulse generator.
Figure 14C:
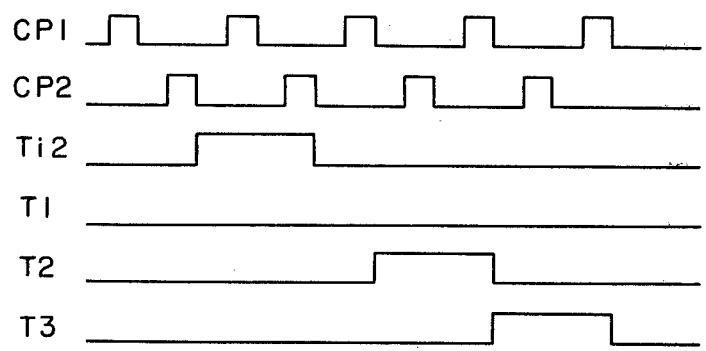

The timing pulse generator 106 shown in FIG. 2 is constituted by a four bit shift register (for example SN7495A sold by TI Co.) for generating outputs T1, T2 and T3 (T4 is not used) synchronous with the clock pulse CP1 when the output pulse signals Ti1 and Ti2 from the address condition gate circuit 107 are received. FIG. 14A shows one example of the timing pulse generator 106, and FIGS. 14B and 14C the waveforms thereof. As shown in FIGS. 14B and 14C, when the pulse signal Ti1 is applied, outputs T1, T2 and T3 are produced successively, whereas when the pulse signal Ti2 is applied the output T1 is not produced but only outputs T2 and T3 are produced. Signal T1 is used to operate address counter 103 to cause it to act as an adder so that the count of counter 103 is increased by one when signal Ti1 is applied. But when pulse signal Ti2 is applied the address counter 103 maintains its count.

Signal T2 is used to set the data from PROM 104 in counter 108 or in the X and Y command counters 109 and 110. The signal T3 is utilized to determine the timing of advancing the address when the type of the control is 01 and 10.

The method of programming the PROM 104 is as follows. The amount of movements in the X and Y axis directions is given by the number of pulses which are commanded directly. Accordingly, the actual amounts of movement of the table in the X and Y axis directions are different in accordance with the value of the pulse representing the amount of movement per one pulse. For example, a case wherein the tables are moved 0.2 mm (the pulse value is 0.2mm/pulse) when one pulse is commanded will be considered. According to this invention, various profile sewing of any shape is possible including a variable pitch sewing, a jump over sewing, a crossed sewing, an arcuate or straight line sewing of any inclination, or a back stitching.

In the following, with reference to an actual part, method of programming and the procedure of operations are discussed. However, for the sake of description, a method of programming will be described with reference to a pattern consisting of sections 1 to 11 shown in FIG. 15 together with various sewing operations described above.

Figure 15:
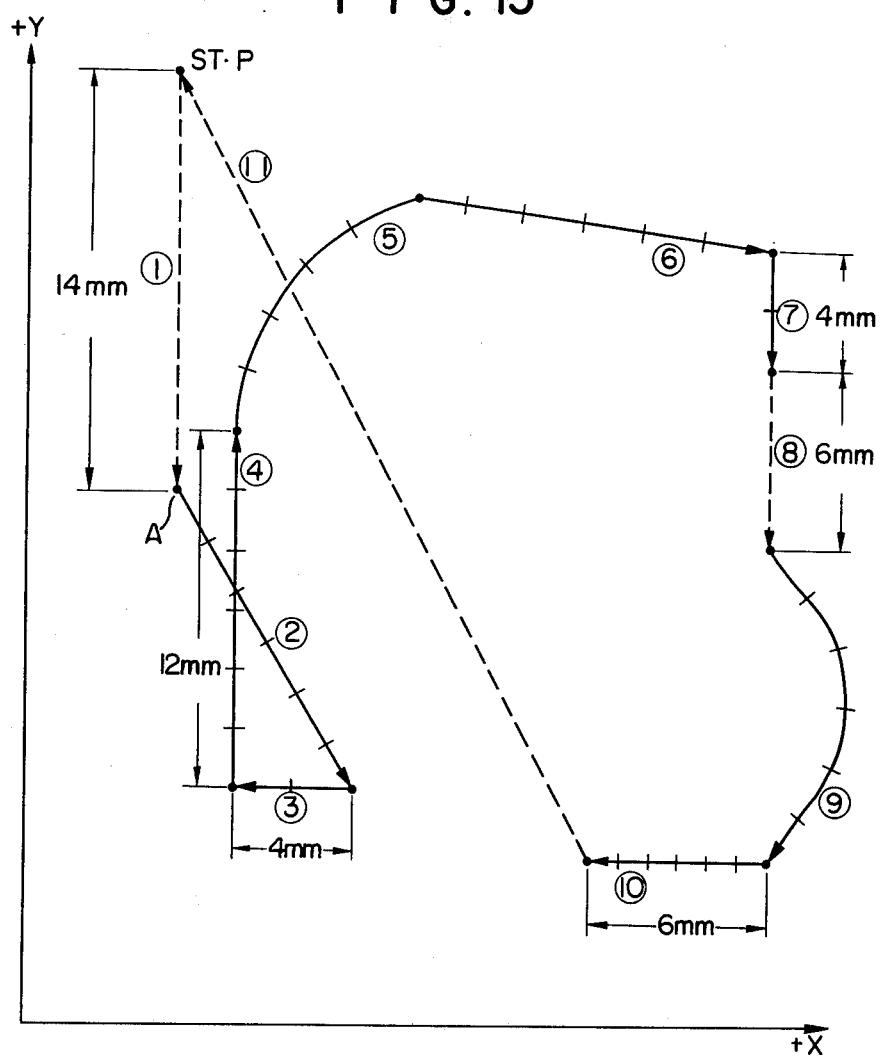
FIG. 15 shows one example of a sewing pattern.

In FIG. 15, solid lines represent the portions to be sewed and the dotted lines show portions not sewed so that at these portions only the X and Y tables are moved. Sort lines intersecting the pattern lines show the positions at which the needle is raised. There are two sewing pitches of 2 mm and 1 mm. Black spots on the lines show positions at which the needle should be idle in order to provide high quality of the sewed products.

The program is prepared such that the X and Y tables are moved such that they start at a starting point ST.P, then successively move along sections 1 to 11 and finally move back to the original starting point. Further, to assist better understanding actual lengths of the lines parallel to X and Y axes are also shown.

Before describing the program necessary to sew a predetermined pattern, a method of determining the data necessary to prepare the program from straight lines, arcuate curves and arbitrary curves which are the elementary shapes of the pattern will be described. In this case, it is assumed now that the pulse value is 0.2 mm/pulse and that the sewing pitch equals to 2 mm.

(1) Straight Line

Figure 16:
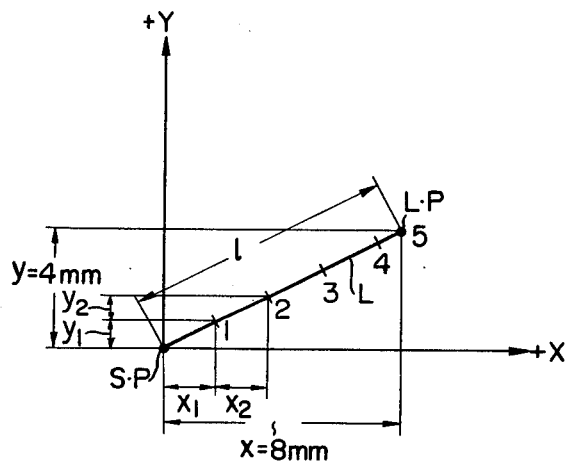
FIG. 16 is a graph for explaining a method of preparing a program for sewing a straight seam.

One example of determining the data in this case is as follows. Firstly, the lengths of the projections of a straight line L passing through the origin SP upon the X and Y axes are measured, as shown in FIG. 16. To improve the accuracy the length of the line L is exaggerated to readily measure the length. Where dimensions are applied to the pattern, such dimensions are used. Let us assume that the length of the projection upon X axis $x = 8$ mm, and that the length of the projection upon Y axis $y = 4$ mm. Then the length of the straight line L is given by an equation $$l = \sqrt{x^2 + y^2} = \sqrt{8^2 + 4^2} \doteq 8.9 \text{ mm}$$

In order to sew this length l of the straight line with a pitch of 2 mm, a length of 8 mm is sewed with 4 idle positions, and after advancing remaining 0.9 mm the needle must be idle or raised.

Where an edge sewing is not necessary, it may be possible to make round the length of 0.9 mm for starting the next seam. It should be remembered that the starting point s.p has already been sewed.

Next, the lengths of the projections of a length of 2mm of the straight line L on the X and Y axes are determined.

Projection on X, $$x_1 = x/l \times 2 = 8/8.9 \times 2 = 1.79 \doteq 1.8 \text{ mm}$$

Projection on Y, $$y_1 = y/l \times 2 = 4/8.9 \times 2 = 0.89 \doteq 0.9 \text{ mm}$$

Since the pulse value is 0.2 mm/pulse the number of pulses Px and Py for respective axes are determined as follows:

$$Px = 1.8/0.2 = 9 \text{ pulses}$$

$$Py = 0.9/0.2 = 4.5 \text{ pulses}$$

Since Px = 9 is an integer, there is no problem. However, as Py is equal to 4.5 pulses it is necessary to select either 4 pulses or 5 pulses. When 4 pulses are selected, the error E for the length of 8 mm on the straight line L is expressed as follows.

| | |
|---|---|
| amount of movement in X directions | $x_2 = 9(\text{pulses}) \times 4 \times 0.2(\text{mm/pulse})$ <br> $= 7.2 \text{ mm}$ |
| amount of movement in Y direction | $y_2 = 4(\text{pulses}) \times 4 \times 0.2(\text{mm/pulse})$ <br> $= 3.2 \text{ (mm)}$ |
| $\therefore E = \sigma - \sqrt{(x2)^2 + (y2)^2}$ | $= 0.1 \text{ mm}$ |

Figure 17:
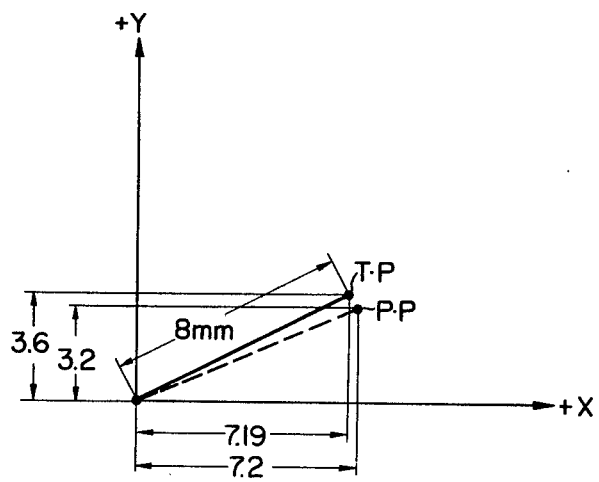
FIG. 17 is a graph for explaining the error in the program for the straight seam.

In the same manner, the error E which occurs when Py is equal to 5 pulses can be determined to be 0.2 mm so that it is advantageous to select 4 pulses for Py. Even when a value Py = 4 pulses is selected, there is a difference between the true position T.P and the programmed position P.P as shown in FIG. 17. This is caused by the fact that the pulse value was temporarily selected to be equal to 0.2 mm/pulse. Where the error causes a problem in the actual sewing operation this problem can be obviated by selecting the pulse value to a smaller value as 0.1 mm/pulse or 0.05 mm/pulse. For example, where the pulse value is selected to be 0.1/pulse for the straight line shown in FIG. 16 the amounts of movement for a length of 0.9 mm are given by

| | |
|---|---|
| the amount of movement in the X direction | $Px = +4 \text{ pulses}$ |
| the amount of movement in the Y direction | $Py = +2 \text{ pulses}$ |

(2) A Case of a Circular Arc or an Arbitrary Curve

Figure 18A:
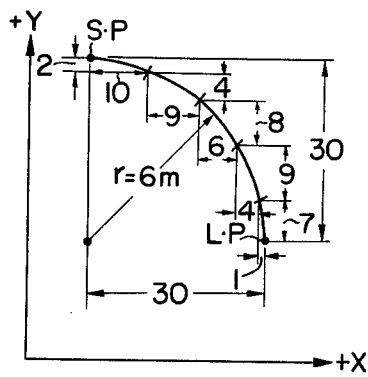
FIG. 18A is a graph for explaining a method of preparing a program for sewing an arcuate seam.
Figure 18B:
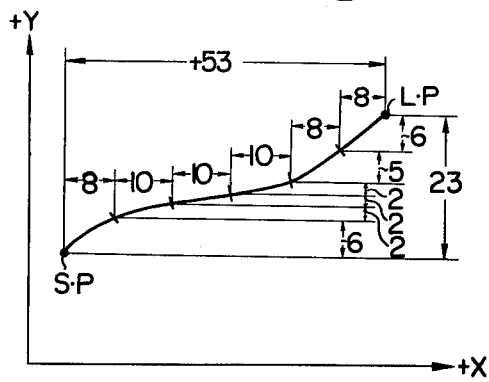
FIG. 18B is a graph for explaining a method of preparing a program for sewing a curved seam of any shape.
Figure 18C:
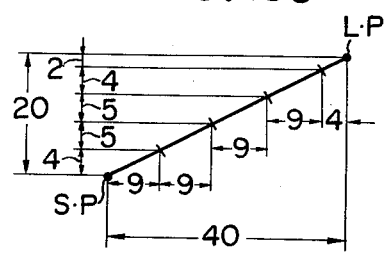
FIG. 18C is a graph showing a program for a straight seam.

The curves shown in FIGS. 18A, 18B and 18C are depicted with a scale magnified by a factor of 5 of the actual dimension. The curves are divided into small arcs or sections at a spacing of 2 mm by using a compass or a divider. The lengths of the projections on the X and Y axes of each section are determined, and the measured values are divided by the pulse value to obtain the number of pulses during one sewing pitch. In FIG. 18A, the numbers of pulses determined in this manner are shown. Thus, the data Px and Py showing the numbers of pulses between the starting point SP and the end point LP of an arc are as follows.

| | |
|---|---|
| $Px_1 = +10$ | $Py_1 = -2$ |
| $Px_2 = +9$ | $Py_2 = -4$ |
| $Px_3 = +6$ | $Py_3 = -8$ |
| $Px_4 = +4$ | $Py_4 = -9$ |
| $Px_5 = +1$ | $Py_5 = -7$ |
| Total $+30$ | $-30$ |

FIG. 18B shows a case of an arbitrary curve.

In the same manner, the values of Px and Py are determined as follows.

| | |
|---|---|
| $Px_1 = +8$ | $Py_1 = +6$ |
| $Px_2 = +10$ | $Py_2 = +2$ |
| $Px_3 = +10$ | $Py_3 = +2$ |
| $Px_4 = +10$ | $Py_4 = +2$ |
| $Px_5 = +8$ | $Py_5 = +5$ |
| $Px_6 = +7$ | $Py_6 = +6$ |
| Total +53 | +23 |

In this case, it is necessary to confirm the fact that the number of pulses determined by the projections of the curve between the starting point SP and the end point LP is equal to the sum of the numbers of the pulses of respective sections. Such coincidence means that there is no error at the starting and end points. Since three data of the second to fourth sections of the arbitrary curve are equal so that these data can be expressed by three ($px = +10$) and ($Py = +2$).

Although, the method of determining the data of a straight line has already been pointed out, except a straight line parallel to X or Y axis, it is advantageous to determine the data by a method similar to those of an arc or an arbitrary curve. FIG. 18C shows one example of this method. In this case, since corrections are made at intermediate points of the straight line no error appears at the end point LP.

One example of preparing a program for the pattern shown in FIG. 15 is as follows:

The starting point ST.P is set at a point remote from the needle so that the clamping members between which a cloth is clamped can readily be set. The starting point may be set at any position within a stroke along the X or Y axis. The straight line ① between the starting point ST.P and a point A from which the sewing operation actually begins is parallel to the Y axis and has a length of 14 mm. Assuming a pulse value of 0.2mm/pulse, by repeating 7 times the data of 10 pulses a value $0.2 \times 10 \times 7 = 14$ mm is obtained, thus reaching point A. During this interval, since an actual sewing is not performed, it is necessary to hold the needle at the upper dead center.

To have a better understanding the type of the control is determined as shown in FIG. 19. Then, the program for the straight line section ① comprises the sequence No. 1 shown in FIG. 19.

Point A is the actual starting position so that to sew the first piece of a group of pieces having the same shape or pattern, it is necessary to correctly position the piece. Accordingly, at this time the optional stop switch is turned ON to stop the operation at point A and then the required positioning is performed by manually moving the X and Y tables. For the second and the following pieces of the same pattern it is not necessary to effect position alignment, so that the optional stop switch is turned OFF. Then, the sewing operation is not stopped at point A but advanced to the next step.

A straight line section ② is inclined and to be sewed at a pitch of 2 mm. Accordingly, the section is divided at a pitch of 2 mm with a compass and the lengths of the projections of the divided sections upon the X and Y axes are measured and converted into pulse numbers as follows.

| Px | Py | |
|---|---|---|
| +5 | −9 | |
| +5 | −8 | |
| +5 | −8 | twice |
| +5 | −9 | |

-continued

| Px | Py | |
|---|---|---|
| +5 | −8 | twice |
| +5 | −8 | |
| Total +30 | −50 | |

The reason that the numbers of the pulses are made different in spite of a straight line is to correct the error caused by a pulse value 0.2 mm/pulse. It is also necessary to correct such that the total number of pulses +30 in the X direction and −50 in the Y direction which are determined for the entire length of straight line ② will coincide with the total number of pulses obtained from respective divided sections. Since the control type of the sewing machine is "1" only for the start and "0" for the other steps, the program can be prepared by using sequences No. 3 to No. 6 shown in FIG. 19.

Since the straight line section ③ is parallel to the axis X its program can be prepared in the same manner as the straight line section ①. Thus, sequences 7 and 8 of the program with "1" at only the starting point can be prepared. The next straight line section ④ is perpendicular to the straight line section ③ and followed by an arcuate section ⑤. The data for section ⑤ can be determined in the same manner as the section ② as follows.

| X axis pulse number | Y axis pulse number |
|---|---|
| +1 | +10 |
| +4 | +9 |
| +6 | +8 |
| +8 | +7 |
| +11 | +5 |
| Total +30 | +39 |

The last data are longer than 2 mm because the last seam comes to the position indicated by a black spot.

The sequences No. 9 to 13 of the program can be prepared from the data described above and a data wherein only the starting point at the control is made "1".

The straight line section ⑥ is also inclined so that its program can be prepared in the same manner as the section ②, the data thereof being:

| X pulse number | Y pulse number |
|---|---|
| +9 | −1 |
| +9 | −2 |
| +10 | −1 |
| +10 | −2 |
| +10 | −1 |
| +12 | −2 |
| Total +50 | −9 |

These data have been corrected like the data for the straight line section ② and the last data has been corrected in the same manner as the arcuate section ⑤. The sequences of the program are Nos. 14 to 19.

The next straight line section ⑦ is similar to section ③. A section 8 in which a jump sewing is made can be programmed in the same manner as the straight line section ① and includes sequences Nos. 20 and 21. Section ⑨ is an arbitrary curve and can be programmed in the same manner as an arc, the data thereof being as follows.

| X pulse number | Y pulse number |
|---|---|
| + 7 | − 8 |
| + 5 | − 8 |
| + 1 | −10 |
| − 2 | −10 |
| − 6 | − 9 |
| − 5 | − 7 |
| Total    0 | −52 |

The program for this section includes sequences No. 22 to 27.

The last straight section ⑩ is sewed at a pitch of 1 mm. This can be accomplished by operating the sewing machine at the same speed for the 2 mm pitch and by varying the amount of movement of the X and Y tables at each needle step. The method of programming is the same as for sections ③, ④ and ⑦ and includes sequence No. 28

Section ⑪ represents a return stroke to the starting point ST.P in which no sewing operation is made, so that any path can be traced so long as the starting point can be reached. Since the maximum number of pulses that can be designated for one step of movement of the tables is ⑮, by applying this data to the direction of Y axis the number of reciprocating the needle can be determined as 8. The corresponding X data is −8 pulses and the program comprises sequence No. 29. The program sequence required to coincide the end point of section ⑪ with the starting point STP is shown by No. 30.

The program is prepared such that the sewing machine is stopped by the next sequence No. 31, the work is exchanged, and the program is returned to sequence No. 1 when the start button is depressed.

FIG. 20 shows a conversion table showing that the sequences described above are converted into binary "1" and "0" required to write the data into PROM 104. FIG. 20 is different from FIG. 19 in that:

(1) The decimal numbers are converted into binary "1" and "0" in each corresponding region. However, for the number of reciprocations of the needle the binary number is converted into BCD type.

(2) Where the number of reciprocations of the needle is one, the type of the control is represented by 00 and the movement data and the sequence data are represented by a single address.

(3) Where the number of reciprocations of the needle is 2 or more, the data are stored in two addresses, one for the type 01 of the control which represents the number of reciprocations of the needle and the other for the type 00 of the control which represents the movement data. The sequence number is the same for the type 00 and the type 01. The conversion can be made by using a standard computer but can also be made readily by a manual operation.

The number of addresses in the PROM is 40 for the program of the pattern shown in FIG. 15. On the other hand, the number of the addresses of the PROM is 256 in the Intel Co. C1702A, for example, so that it is possible to store a number of patterns in the same PROM. In this example, address selection switching circuit 101 (FIG. 2) is provided for the purpose of selecting any one of the addresses.

The control system of this invention operates as follows.

A program is prepared by the method described above in accordance with the profile or pattern of a work to be sewed such as a collar or a pocket cover, sewing machine control signals and the sequence of sewing as the program is written into two PROMs by using a PROM writer.

As above described, programs of different profiles or patterns of the parts to be sewed can be stored in a pair of PROMs 104 each having 256 addresses. To write a program of a new profile, the program of the old profile is erased.

If it is desired to preserve an old program the new program is stored in an additional pair of PROMs. To enable this each PROM is formed on a single printed board thus making ready exchange of the PROM unit. With this construction, works repeatedly sewed can be produced by storing the programs thereof. Where the program is used only once, such program can be erased for storing a new program.

Suppose now that PROMs which store programs as above described are incorporated into the control system, and that the programs stored in the PROMs have the forms as shown in FIGS. 15, 19 and 20.

In FIG. 2, the address selection switching circuit 101 including 8 switches is set to 0000 0001, that is the first address. In the 0th address shown in FIG. 20, the type of the control is written as a data "11" while the other data are written as "0". At this time, the first piece of the cloth 27 is clamped between clamping members 28.

After the preparation operations described above, the X and Y tables 20 and 24 are manually moved to a position near the starting point ST.P where the clamping members can readily be set by manual operation. Such manual operation is necessary only when the profile of a new type is sewed for the first time. Thus, such operation is not necessary for the second and the following pieces of the work having the same profile. Moreover, as it is possible to set the starting position ST.P at any position so long as it is in the stroke of the X and Y tables 20 and 24, the cloth clamping members 28 can be set to the most convenient position. This should be considered at the time of preparing the program. Then the manual-automatic transfer switch is operated and the clear button of the control panel 16 is depressed for the purpose of clearing the address counter 103. This operation is not necessary for the second and succeeding pieces of the same profile. When cleared, the address counter 103 produces 8 outputs A0 through A7 which are all "0" thereby designating the 0th address of the PROM 104. Since in the 0th address it have been stored data in which the type of the control is "11" and the other all bits are "0", upon depression of the start button, the address gate circuit 102 is enabled. Consequently, after resetting the address counter 103 by signal ACR, the state 0000 0001 which has been set in the address selection switching circuit 101 is set in the address counter 103 by signal $\overline{ACS}$. Thus, the first addresses of a pair of PROMs are selected. However, the data at the first address has not yet been read. To read this data, the $\overline{ACS}$ signal is also applied to the address condition gate circuit at the same time for turning the signal conductor b shown in FIG. 12 to "1" thus producing one pulse signal Ti2. This pulse signal is applied to the timing pulse generator 106 producing pulses T2 and T3.

The data at the first address of the PROM 104 represents the number of operations so that signal $\overline{01.T2}$ is converted into "0" at time T2 by the decoder 105 which sets digit 7 (0000 0111) in the counter 108 by signals D11, D28–D26 and D24–D21.

At the next time T3, the decoder 105 converts signal $\overline{01.T3}$ into "0" thus turning the signal line a (FIG. 12) of the address condition gate 107 to "1" whereby a single pulse Ti₁ is generated from the pulse generating circuit 335, The pulse Ti₁ is applied to the timing pulse generator 106 for producing pulses T1, T2 and T3. In response to pulse T1, the count of the address counter 103 is increased by one and its outputs A7 through A0 designate 0000 0010, or the second address. The second address of the PROM 104 represents the data for the amount of movement of the X and Y tables 20 and 24 showing that the X axis should be moved over a distance corresponding to zero pulse and the Y axis should be moved in the negative direction over a distance corresponding to 10 pulses. In this manner, pulse T2 converts signal $\overline{00.T2}$ from the decoder 105 into "0" whereby the data at the second address of PROM 104 are set in the X and Y command counters 109 and 110 by the outputs D11, D28–D26 and D24–D21. When set with data other than zero, the output ($\overline{XCO}$) from the NAND gate circuits 291 and 292 shown in FIG. 11 becomes "1". In this case, since the content of the X command counter 109 is zero, $\overline{XCO} = 0$. In the same manner, since the content of the Y command counter 110 is 1010, that is 10, $\overline{YCO} = 1$. Accordingly, the feed pulse EP from the pulse generator 111 is passed through the gate circuit 283 for the Y axis to produce signal $\overline{YFP}$ which is used to drive pulse motor 116. At the same time the content of the Y axis command counter 110 is subtracted by one.

The pulse train signal $\overline{YFP}$ for driving the pulse motor 116 is caused to pass through the Y gate circuit 304 in the positive or negative direction by the content of the 4th bit of the PROM-2 which is the Y sign bit, that is the signal D25 to enter into the pulse amplifier 306. In this case, the signal is applied to the negative direction terminal, thus rotating the pulse motor 116 in the negative direction. When the content of the Y command counter 110 becomes zero by the repitition of the above described operation, signal $\overline{YFP}$ becomes "0" and the NAND gate circuit 293 is disenabled to block feed pulse FP.

When signal $\overline{YFO}$ becomes "0" signal $\overline{XCO}$ also becomes "0" so that NOR gate circuit 312 of the address condition gate circuit 107 (FIG. 12) is enabled. However, the output $\overline{NC2}$ of the counter 108 which counts the number of operations is yet turned to "0". Further, since the start signal D16 is "0" (FIG. 12), the signal conductor b of the address condition gate circuit 107 (FIG. 12) is immediately turned to "1" thus producing one Ti2 pulse.

Further, as signal $\overline{NC2}$ is "1" and both signals $\overline{XCO}$ and $\overline{YCO}$ are "0", signal NiN becomes "1" thereby subtracting the content of the counter 108 by one.

The pulse Ti₂ is applied to the timing pulse generator 106 for generating pulses T2 and T3. Since the second address of PROM 104 is selected by the address counter 103 the pulse signal $\overline{00.T2}$ of signal T2 becomes "0" thus setting the date regarding the amount of movement stored in PROM 104 into the X and Y command counters 109 and 110. Consequently, the pulse motors 115 and 116 are rotated in predetermined directions until the command counters 109 and 110 count out. When counted out, the content of the number counter 108 is subtracted by one to read again the data in the PROM 104. Such operation is repeated until the number counter 108 counts out. During such operation, the sewing machine is controlled by the control signals produced by the 5th to 2nd bits of PROM 1. More particularly, at the first and second addresses, the sewing machine is stopped, and the needle is held at the upper dead center so that only the X and Y tables are moved as described above without performing any sewing operation.

When the number counter 108 counts out, the X and Y tables are moved to point A from the starting point ST.P. More particularly, the tables are not moved in the direction of X axis but moved 7 times in the direction of Y axis each for over a distance corresponding to $-10$ pulses. Since the pulse value is 0.2 mm/pulse the amount of movement in the Y axis direction is $-10 \times 7 \times 0.2 = -14$ mm, thus bringing the X and Y tables 20 and 24 and the needle 29 to point A.

Then, when the X and Y command registers 109 and 110 count out ($\overline{XCO} = \overline{YCO} = 0$) and when the number counter 108 also counts out ($\overline{NC1} = \overline{NC2} = 0$), the needle 29 is at the upper dead center and the sewing operation is stopped (D=16). Under these conditions, the signal conductor a of the address condition gate circuit 107 becomes "1" thereby producing a Ti₁ pulse.

The pulse Ti₁ actuates the timing pulse generator 106 so as to form timing pulses T1, T2 and T3 whereby the count of the address counter 107 is increased by one and the third address of PROM 104 is designated. This address is storing the control type "10" and all other data of "0".

Then, the decoder 105 turns signal $\overline{10}$ to "0" which is applied to the address condition gate circuit 107 to perform the following two operations depending upon the state of the optional stop signal $\overline{OS}$.

(a) When the optional stop switch is ON, the signal $\overline{OS}$ is in "0" state, so that the NAND gate circuit 316(FIG. 12) is not enabled even when the pulse T3 is received, thus not producing pulse Ti₁.

At this time, the X and Y tables 20 and 24 are held stationary. In this case, since it is necessary to correctly align the starting position at point A, the manual-automatic transfer switch is thrown to the manual side thereby moving the X and Y tables 20 and 24 so as to bring the needle to point A. Upon completion of the positioning the manual-automatic transfer switch is transferred to the automatic side to turn OFF the optional switch (when sewing the second and the following pieces, the positioning is made automatically).

Then, the start button is depressed to turn signal STF to "1" state, with the result that the gate circuit 316 is enabled to turn the signal conductor a to "1" thereby producing a pulse Ti₁.

(b) When the optional stop switch is OFF, signal $\overline{OS}$ is "1". Accordingly, when pulse T3 is received, pulse Ti₁ is produced.

The address is advanced by one by the pulse Ti₁ thereby selecting the fourth address. The data in this address is "1" for starting the sewing operation but all other data are "0". The same pulse is used for the 30th address for the same reason. However, when it is not necessary to lower the needle 29 onto the starting point A, this process step is not necessary.

Even when the fourth address is read by the address condition gate circuit 107 signals $\overline{XCO}$, $\overline{YCO}$, $\overline{NC1}$ and $\overline{NC2}$ are all zero, and signal D16 is "1" so that the sewing machine is at the starting condition. The needle lowering signal is a "0" pulse synchronized with the clock pulse OP2 at the time of raising the needle 29 from the cloth 27. Thus, this signal is "0" when the data is read, so that the signal conductor a is "0". However, as the machine has already been started, a needle lowering "1" pulse is generated when the needle 29 is lowered to penetrate through the cloth, stick the cloth at point A, and then withdrawn from the cloth. At this time, conductor a becomes "1" thereby producing a timing pulse $Ti_1$, which is used to produce timing pulses for reading the fifth data.

This data moves X axis over a distance corresponding to + 5 pulses and the Y axis over a distance corresponding to − 9 pulses. These movements are effected while the neelde 29 is withdrawn from the cloth 27. Then, the X and Y command counters 109 and 110 count out ($\overline{XCO} = \overline{YCO} = 0$) so that X and Y tables 20 and 24 are stopped. At this time, since the needle lowering signal is "0" the address is not advanced. When the needle 29 is lowered and then raised after stitching the cloth 27, the needle lowering signal produces an "1" pulse for reading the next address. In this manner, during the starting of the sewing operation a sequential operation of moving the X and Y tables 20 and 24, — stopping the same — lowering the needle to stitch the cloth — and reading the data while the needle is raised, thus performing an intermittent stitching thereby improving the quality of the stitch. The above described operation is repeated until address 41 is reached. When address 42 is reached, starting point ST.P is reached again and the operation is stopped.

For sewing the second and following pieces of the same pattern, the clamping members 28 are set, and the start button is depressed to select the first address. Accordingly, by maintaining OFF the optional stop switch, the sewing operation is continued until the sequences up to address 42 are performed without stopping the machine.

For the sake of description above description refers to a special pattern shown in FIG. 5 but it should be understood that the invention is also applicable to an automatic pattern sewing of any shape.

Furthermore, the above described control system is a type of a sequence control wherein the data stored in a designated address are read out sequentially to drive the head of the sewing machine as well as the X and Y tables. However, the control system as a whole is of the open loop type, and there is no means for checking whether the cloth is sewed as contemplated or not.

Accordingly, in order to form a closed loop type control system, a white sheet of paper depicted with a sewing pattern with black spots is moved by the X and Y tables together with a cloth to be sewed and a detection head for optically detecting the black spots may be provided. The output of the detection head is compared with a needle lowering signal. This modification assures more accurate pattern sewing.

The control system of the invention has the following advantages.

(1) Different from the prior art automatic profile sewing wherein a profile platen or cam is used, it is not necessary to accurately machine the cloth clamping member, nor to prepare accurately machined platen or cam.

(2) Profile sewings of any shape are possible including a variable pitch sewing, a cross sewing, an arcuate or inclined straight line sewing and return stitching.

(3) It is possible to control the position of needle lowering to provide a one point stitching.

(4) It is possible to select any desired program by storing a plurality of programs for different sewing profiles in a memory device.

(5) Where a new program is necessary, it is possible to erase an old program and write a new program in the memory device.

(6) If desired, it is possible to preserve old programs for reuse.

(7) An intermittent stitching can be made by stopping the X and Y tables while the needle is piercing the cloth and by feeding the tables while the needle is withdrawn from the cloth.

(8) It is possible to perform a profile sewing of any shape by memorizing the profile in the form of a number of pulses, by memorizing the control signal for the sewing machine in the form of ON and OFF or binary codes and by memorizing these sequences in the order of the programs.

(9) The starting point to which the cloth clamping members are set can be readily selected within the stroke of the X and Y tables.

(10) Since the pulses T1, T2 and T3 are produced by the timing pulse generator at different instants, after applying the pulse T1 to the address counter to act as an addition command signal th data in PROM can be read out, thereby obviating erroneous operation.

We claim:

1. In an automatic sewing machine comprising a stationary table, a head of a sewing machine mounted on said table and including a needle and driving means for vertically reciprocating said needle, a support carrying a clamping member adapted to clamp a cloth to be sewed, a pair of pulse motors for moving said support to any position in a plane defined by X and Y coordinate axis, and a control system for supplying driving pulses to said driving motors for sewing said cloth according to a seam of a predetermined profile, and for supplying control signals to said driving means for vertically moving said needle and stopping said needle at the upper or lower dead center; said control system including a memory device in which information regarding the number of pulses required to drive said pulse motors for driving said clamping member in the X and Y direction of said rectangular coordinates, said pulses being produced by converting said profile into the amounts of movements in said X and Y directions, and information commanding the starting of the sewing operation, thread cutting, vertical reciprocation of the needle and stopping of the needle at the upper or lower dead center are stored in the form of binary codes and according to the predetermined sequences of the sewing operation; a timing pulse generator for generating a timing pulse which determines the timing of reading the information stored in said memory device; an address counter operated by the timing pulse generated by said timing pulse generator for designating the address of information to be read; an address condition gate circuit operating to determine whether the information at a new address of said memory is to be read or the information at the same address is to be read repeatedly; and counter means for processing the readout information to determine the amounts of movement of said support in the X and Y directions and to set the number of repeated operations, a method for determining said informations to be stored in said memory device comprising the steps of:

depicting said predetermined profile on a sheet of paper;

dividing said profile into a plurality of sections at a predetermined pitch;

projecting respective sections on the X and Y axes of said rectangular coordinates; and measuring the projected lengths of respective sections in terms of the number of pulses.

2. An automatic sewing machine comprising a stationary table, a head of the sewing machine mounted on said table and including a needle and driving means for vertically reciprocating said needle, a support carrying a clamping member adapted to clamp a cloth to be sewed, a pair of pulse motors for moving said support to any position defined by X and Y rectangular coordinate axes, and a control system for supplying driving pulses to said pulse motors for sewing said cloth according to a seam of a predetermined profile, and for supplying control signals to said driving means for vertically moving said needle and stopping the same at a upper dead center;

said control system including a memory device in which is stored information regarding the number of operations to be repeated, regarding control signals which reciprocate said needle, thread cutting and needle stop at said upper dead center, regarding the number of pulses required to drive said pulse motors for moving said support by one sewing pitch in X and Y directions of said rectangular coordinates and regarding the repeating numbers of a sewing stitch in said directions;

a timing pulse generator for generating a plurality of timing pulses, one of said timing pulses being used to determine a timing of reading the information stored in said memory device;

an address counter operated by another timing pulse generated by said timing pulse generator for designating an address of information to be read;

an address condition gate circuit which operates to determine whether information at a new address of said memory device is to be read or the information at the same address is to be read repeatedly; and counter means for processing read out information to determine the amount of movement of said support at one sewing pitch in X and Y directions, and to set the number of repeating operations;

said counter means including an X command counter, a Y command counter and an operation number counter which are controlled by said one timing pulse to be set with information read out from the address of said memory device, said operation number counter being connected to be controlled by an output of said address condition gate circuit for repeatedly setting said informations in said X and Y command counter each time when these counters count out.

3. The automatic sewing machine according to claim 1 wherein said control system further includes an address selection switching circuit for selecting the leading address of pattern programs stored in said memory device.

4. The automatic sewing machine according to claim 1 wherein said memory device comprises a pair of programmable read only memory devices connected to receive the output from said address counter for producing signals which are respectively supplied to said X command counter for controlling one of said pulse motors to move said support in the X direction, to said Y command counter for controlling the other pulse motor to move said support in the Y direction and to a number counter for setting the number of repeated readings.

5. The automatic sewing machine according to claim 1 wherein said control system comprises memory means including a plurality of addresses in which various programs required to control the operation of the sewing machine are stored in the form of binary codes;

a timing pulse generator for generating a plurality of timing pulses;

an address selection switch circuit including a plurality of switches for producing a plurality of signals for selecting a desired address of a predetermined program stored in said memory means;

an address gate circuit for determining a condition for setting an address;

an address counter controlled by the outputs from said address gate circuit and said address selection switch circuit and a timing pulse which is one of said timing pulses generated by said timing generator for producing outputs for designating addresses of said memory means, the count of said address counter being increased stepwisely by said timing pulse;

a decoder which decodes the information readout from said memory means in accordance with the other timing pulses generated by said timing pulse generator;

an address condition gate circuit responsive to the output from said decoder and responsive to countout signals of X and Y command counters and responsive to a countout signal of said operation number counter to determine whether a new address of said memory means is to be read or the same address to be read repeatedly;

a number counter in which said repeated numbers is to be set; and

X and Y command counters in each of which is set the number of pulses required to drive said pulse motors for moving said support by one sewing pitch in X and Y directions respectively.

6. The automatic sewing machine according to claim 4 wherein said control system further comprises a manual operator for manually controlling said pulse motors independently of said X and Y command counters.

7. In an automatic sewing machine comprising a stationary table, a head of a sewing machine mounted on said table and including a needle and driving means for vertically reciprocating said needle, a support carrying a clamping member adapted to clamp a cloth to be sewed.

a pair of pulse motors for moving said support to any position in a plane defined by X and Y coordinate axes, and a control system for supplying driving pulses to said driving motors for sewing said cloth according to a seam of a predetermined profile, and for supplying control signals to said driving means for vertically moving said needle and stopping said needle at the upper dead center;

said control system including a memory device for storing information regarding the number of pulses required to drive said pulse motors for moving said support in X and Y directions of said rectangular coordinates, said pulses being produced by converting said profile into the amount of movement by one sewing pitch in said X and Y directions and repeated number of said movement, and information commanding the starting of a sewing operation, thread cutting, vertical reciprocation of said needle and stopping of the needle at the upper dead center, said information being binary codes;

a timing pulse generator for generating timing pulses, one of which determining a timing of reading the information stored in said memory device;

an address counter operated by one of the timing pulses generated by said timing pulse generator for designating the address of information to be read;

an address condition gate circuit operating to determine whether the information at a new address of said memory device is to be read or the information at the same address is to be read repeatedly; and counter means for processing the readout informations to determine the amount of movement of said support by one sewing pitch in X and Y directions and to set the number of repeated operations;

a method for determining said information to be stored in said memory device comprising the steps of:

depicting said predetermined profile on a sheet of paper;

dividing said profile into a plurality of sections at a predetermined pitch;

projecting respective sections on the X and Y axes of said rectangular coordinates; and measuring the projected lengths of respective sections in terms of the number of pulses.

* * * * *